(12) United States Patent
Ohashi et al.

(10) Patent No.: US 8,007,159 B2
(45) Date of Patent: Aug. 30, 2011

(54) SURFACE ILLUMINATOR AND LIQUID CRYSTAL DISPLAY HAVING THE SAME

(75) Inventors: Noriyuki Ohashi, Taki-gun (JP); Tetsuya Hamada, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/768,774

(22) Filed: Apr. 28, 2010

(65) Prior Publication Data
US 2010/0208164 A1 Aug. 19, 2010

Related U.S. Application Data

(62) Division of application No. 11/386,976, filed on Mar. 22, 2006, now Pat. No. 7,736,047.

(30) Foreign Application Priority Data

Mar. 29, 2005 (JP) ................................ 2005-095102

(51) Int. Cl.
*F21S 4/00* (2006.01)
(52) U.S. Cl. .......................... 362/612; 362/231; 362/632
(58) Field of Classification Search .................. 362/610, 362/612, 613, 609, 615, 631, 632, 800, 231
See application file for complete search history.

(56) References Cited

U.S. PATENT DOCUMENTS

| | | | |
|---|---|---|---|
| 6,636,003 B2 * | 10/2003 | Rahm et al. ................... | 315/179 |
| 6,697,130 B2 * | 2/2004 | Weindorf et al. ............... | 349/65 |
| 7,001,058 B2 * | 2/2006 | Inditsky ........................ | 362/610 |
| 7,126,567 B2 * | 10/2006 | Nishikawa ...................... | 345/77 |
| 7,388,569 B2 * | 6/2008 | Agari et al. .................... | 345/102 |
| 7,460,196 B2 * | 12/2008 | Kim et al. ........................ | 349/64 |
| 7,510,300 B2 * | 3/2009 | Iwauchi et al. ................ | 362/231 |
| 2003/0165067 A1 | 9/2003 | Imamura et al. | |
| 2005/0024847 A1 | 2/2005 | Ahn et al. | |

FOREIGN PATENT DOCUMENTS

| | | |
|---|---|---|
| JP | 2002-196151 A | 7/2002 |
| JP | 2003-173711 A | 6/2003 |
| JP | 2005-056842 A | 3/2005 |

OTHER PUBLICATIONS

Ohashi et al.; "Surface Illuminator and Liquid Crystal Display Having the Same"; U.S. Appl. No. 11/386,976, filed Mar. 22, 2006.

* cited by examiner

*Primary Examiner* — Stephen F Husar
*Assistant Examiner* — Peggy A. Neils
(74) *Attorney, Agent, or Firm* — Keating & Bennett, LLP

(57) ABSTRACT

The invention provides a surface illuminator capable of achieving high display quality by employing an array of discrete light sources constituted by a plurality of LEDs and a liquid crystal display having the same. The surface illuminator includes an LED module which is a plurality of LEDs alternately and discretely provided along a light entrance surface and a color irregularity correcting resistor which is connected in parallel with a predetermined LED at an end of the LED module and which provides a bypass for a current supplied to the LED.

9 Claims, 30 Drawing Sheets

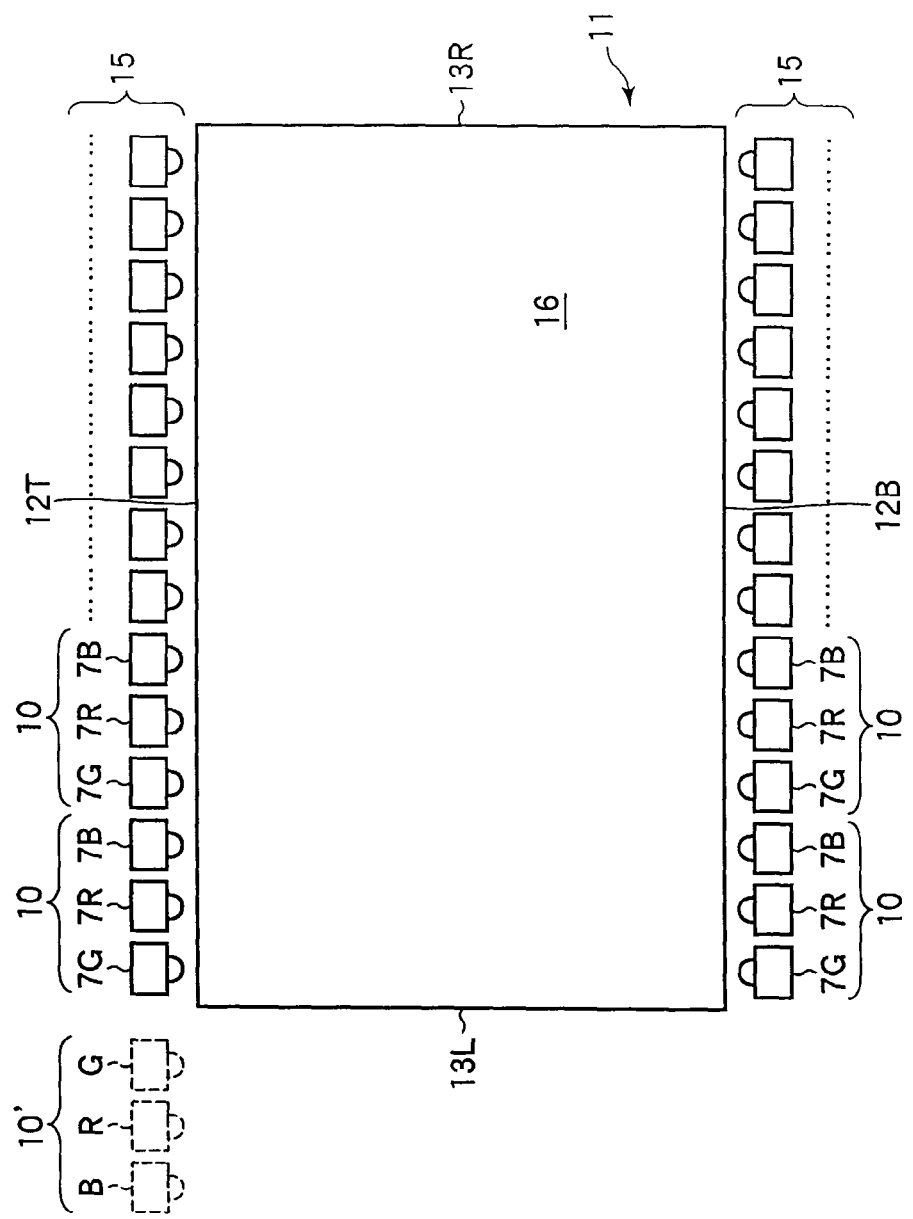

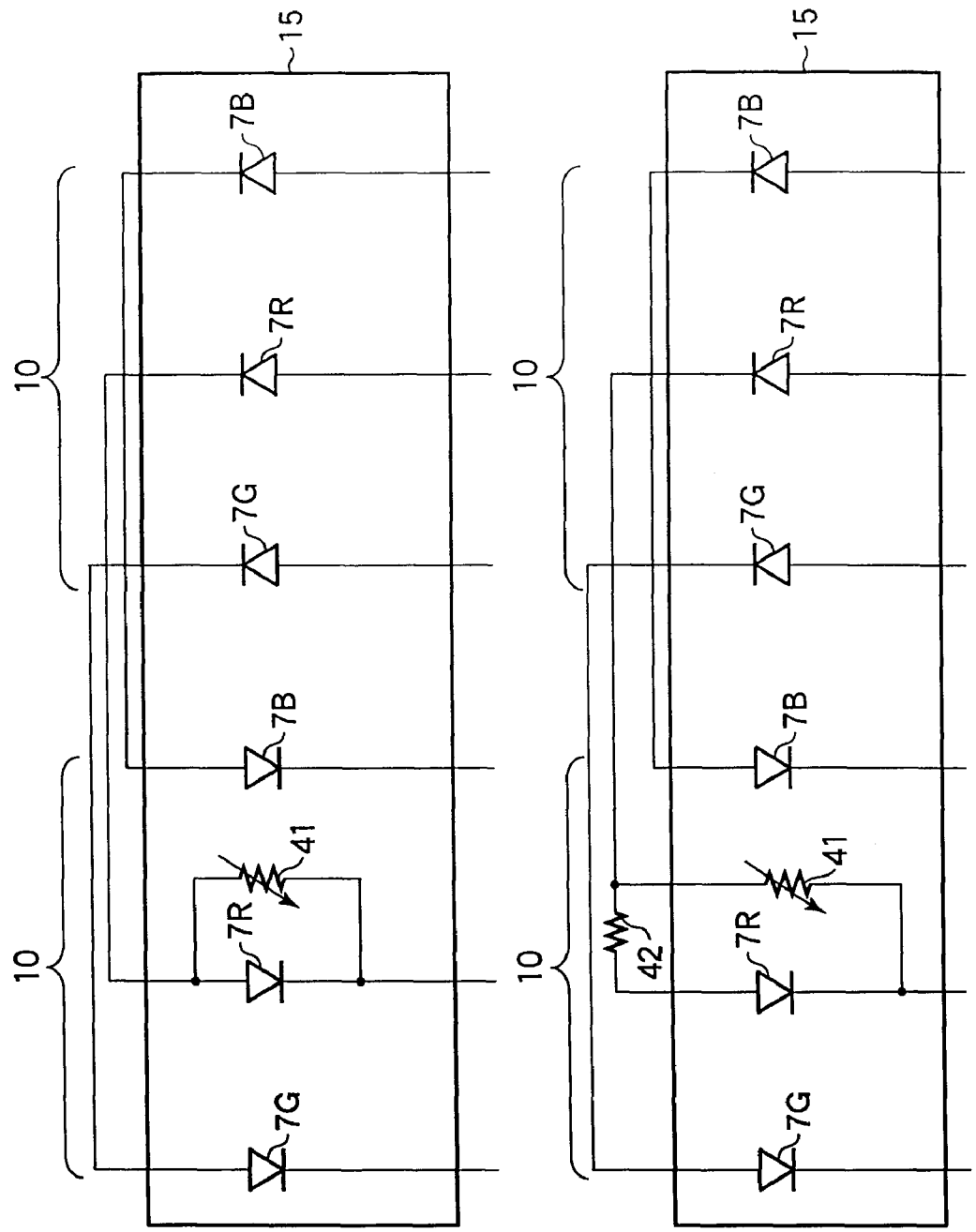

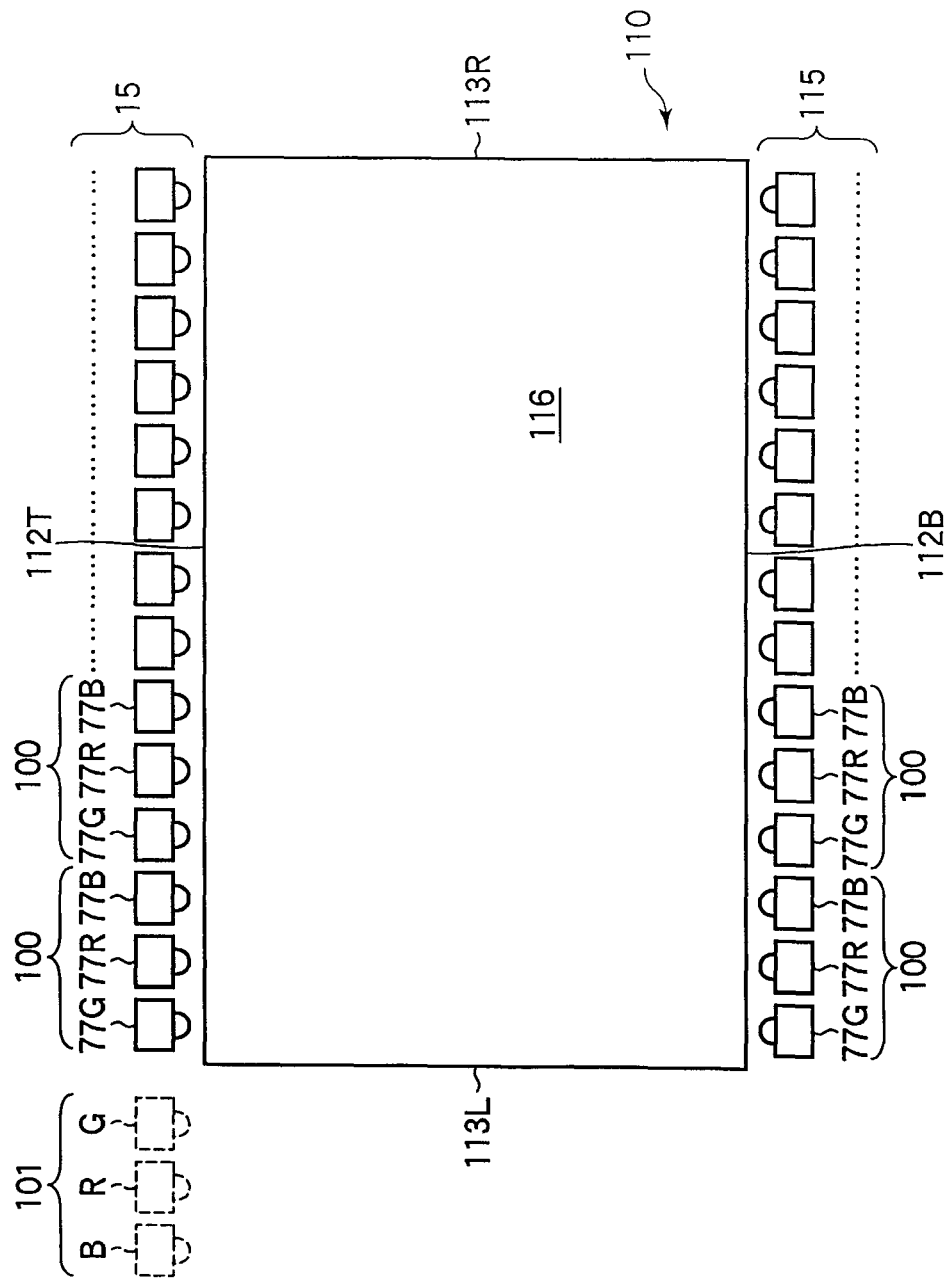

SURFACE ILLUMINATOR AND LIQUID CRYSTAL DISPLAY HAVING THE SAME

BACKGROUND OF THE INVENTION

1. Field of the Invention

The present invention relates to a surface illuminator utilizing an array of discrete light sources and a liquid crystal display having the same.

2. Description of the Related Art

A liquid crystal display is provided with a surface illuminator on a front side or back side of a liquid crystal display panel thereof. Backlight units which are surface illuminators disposed on the back side of a panel include side light (edge light) types including a light source disposed along a side edge of a light guide for guiding light and direct types including a light source disposed directly under a liquid crystal display panel. While cold-cathode tubes are used as light sources in general, it is not preferable to use a cold-cathode tube that utilizes mercury under the recent circumstance in which environmental problems are taken seriously. For this reason, various light sources such as mercuryless fluorescent tubes and LEDs (light-emitting diodes) have been developed as light sources to replace cold-cathode tubes, and LEDs are regarded most promising as next generation light sources.

When LEDs are used as a light source of a side light type backlight unit, the light source may be configured by arranging a plurality of white LEDs or arranging a plurality of sets of LEDs, each set consisting of monochromatic LEDs emitting light in different colors (e.g., red (R), green (G), and blue (B)). A white LED is a combination of a yellow-emitting fluorescent body and a blue-emitting LED, and it has relatively small variation in the color of emission. Backlight units utilizing a combination of R, G, and B monochromatic LEDs are attracting keen attention for their capability of achieving a vast range of color reproducibility (e.g., the adobe RGB range) which is not achievable with white LEDs.

A proposal has been made on a system (sub light guide system) involving a light guide region which is provided for mixing the colors of beams of light emitted by an array of discrete light sources and which is not used as a display area (see Non-Patent Document 1). However, there is a problem in that the system as a whole results in very low utilization of light because light enters a sub light guide from LEDs and enters a main light guide from the sub light guide at low efficiency. Since the low utilization of light necessitates an increase in the power supplied and consequently necessitates countermeasures against heat, a problem also arises in that the size of a device is increased to accommodate radiation fins. As a solution to those problems, a backlight unit has been proposed, in which an air region having a predetermined thickness is provided between a light guide and a diffusing plate to improve mixing of emission colors. FIG. 30 schematically shows a light guide and LED modules used in the proposed backlight unit. As shown in FIG. 30, LED modules 115 are provided on both of side surfaces (light entrance surfaces) 112T and 112B along the longer sides of a rectangular light-emitting surface 116 of a light guide 110 in the form of a thin plate. Both of side surfaces along the shorter sides of the light guide 110 are constituted by reflective surfaces 113L and 113R to allow high utilization of light from the LED modules 115.

The number of LEDs 77 in each color among the LED modules 115 is determined by the setting of white balance. Normally, one set of LEDs is constituted by a combination of one each B (blue) emission LED 77B, R (red) emission LED 77R, and G (green) emission LED 77G. By arranging the LEDs 77 in each color at equal intervals, the colors of the individual LEDs 77 are visually perceived at substantially the same distance from a light entrance surface 112 regardless of the types of the LEDs 77.

Therefore, the LED modules 115 include LED sets (hereinafter also referred to as "GRB" sets as occasion demands) 100 located at side ends of the reflective surface 113L, the LED sets being a series of LED sets starting at the ends of the reflective surface 113L and each consisting of a G (green) emission LED 77G, an R (red) emission LED 77R, and a B (blue) emission LED 77B provided in the order listed. A plurality of the LED modules 115 are provided in series from the left ends of the light entrance surfaces 112T and 112B of the light guide 110, "GRB" sets 100 serving as unit light sources, the width of the "GRB" sets constituting the pitch of the modules.

When such a configuration is employed, at an arbitrary point inside the light exit surface 116, three beams of light from a G-emission LED 77G, an R-emission LED 77R, and a B-emission LED 77B in the neighborhood of the arbitrary point can be mixed to generate a beam of light in a desired color.

Let us now discuss an arbitrary point which is located, for example, in the neighborhood of the top of the reflective surface 113L along the left shorter side of the light exit surface 116. Light arriving at this point includes not only direct light from the "GRB" set 100 at the left end of the light entrance surface 112T but also light from a "BRG" set 101 which is a mirror image generated as a result of reflection of the light from the "GRB" set 100 at the reflective surface 113L. The result is equivalent to arranging a set of six LEDs, i.e., B, R, G, G, R, and B LEDs in the order listed from the left side of the figure in the neighborhood of the arbitrary point near the top of the reflective surface 113L. Beams of light from a four-LED set, i.e., an "RGGR" set that is located closer to the arbitrary point are mixed with each other at relatively high intensity, and there will be no "B" beam at all. As a result, mixed white that lacks a blue component is generated ay the arbitrary point, and a problem therefore arises in that a yellowish color irregularity is liable to occur in the neighborhood of the top end of the reflective surface 113L. Such a color irregularity can occur also at the bottom end of the reflective surface 113L and the top and bottom ends of the reflective surface 113R on the right when the same LED arrangement is employed. The same problem occurs even if the LED sets 100 have a "GBR" pattern instead of the "GRB" pattern.

A method of avoiding the problem is to exclude regions having such a color irregularity from the display area, but the method is not preferable in that the picture frame region of the display will be consequently expanded by about 5 cm in the vertical or horizontal direction of the display. In the case of a large LED backlight employing 100 or more LEDs, there are variations in the emitting efficiency and emission wavelength of the LEDs, and the variation will result in irregularities in the vicinity of the picture frame.

Patent Document 1: JP-A-2003-215349
Patent Document 2: JP-A-2004-95390
Non-Patent Document 1: Nikkei Electronics No. 844 pp. 126-127, Mar. 31, 2003

SUMMARY OF THE INVENTION

It is an object of the invention to provide a surface illuminator which employs an array of discrete light sources to provide high display quality and a liquid crystal display having the same.

The above-described object is achieved by a surface illuminator characterized in that it includes a light exit region which spreads in the form of a plane and from which light exits, a light guide region for guiding light to the light exit region, a light entrance surface through which light enters the light guide region, a reflective surface extending from an end of the light entrance surface and reflecting light in the light guide region, an LED module including a plurality of LEDs alternately and discretely provided along the light entrance surface, and a color irregularity correcting resistor connected in parallel with predetermined one or more of the LEDs.

The invention makes it possible to provide a surface illuminator which employs an array of discrete light sources to provide high display quality and a liquid crystal display having the same.

BRIEF DESCRIPTION OF THE DRAWINGS

FIG. 3 shows a positional relationship between a light exit surface 16 of a light guide 11 of the backlight unit 6 and an LED light module 15 in the mode for carrying out the invention, the positional relationship being shown in a view taken in a direction normal to the light exit surface 16;

FIGS. 5A and 5B show schematic configurations of an LED module according to Embodiment 2 in the mode for carrying out the invention;

FIG. 30 schematically shows a light guide and an LED module used in a backlight unit proposed in the related art.

DESCRIPTION OF THE PREFERRED EMBODIMENT

Figure 1:
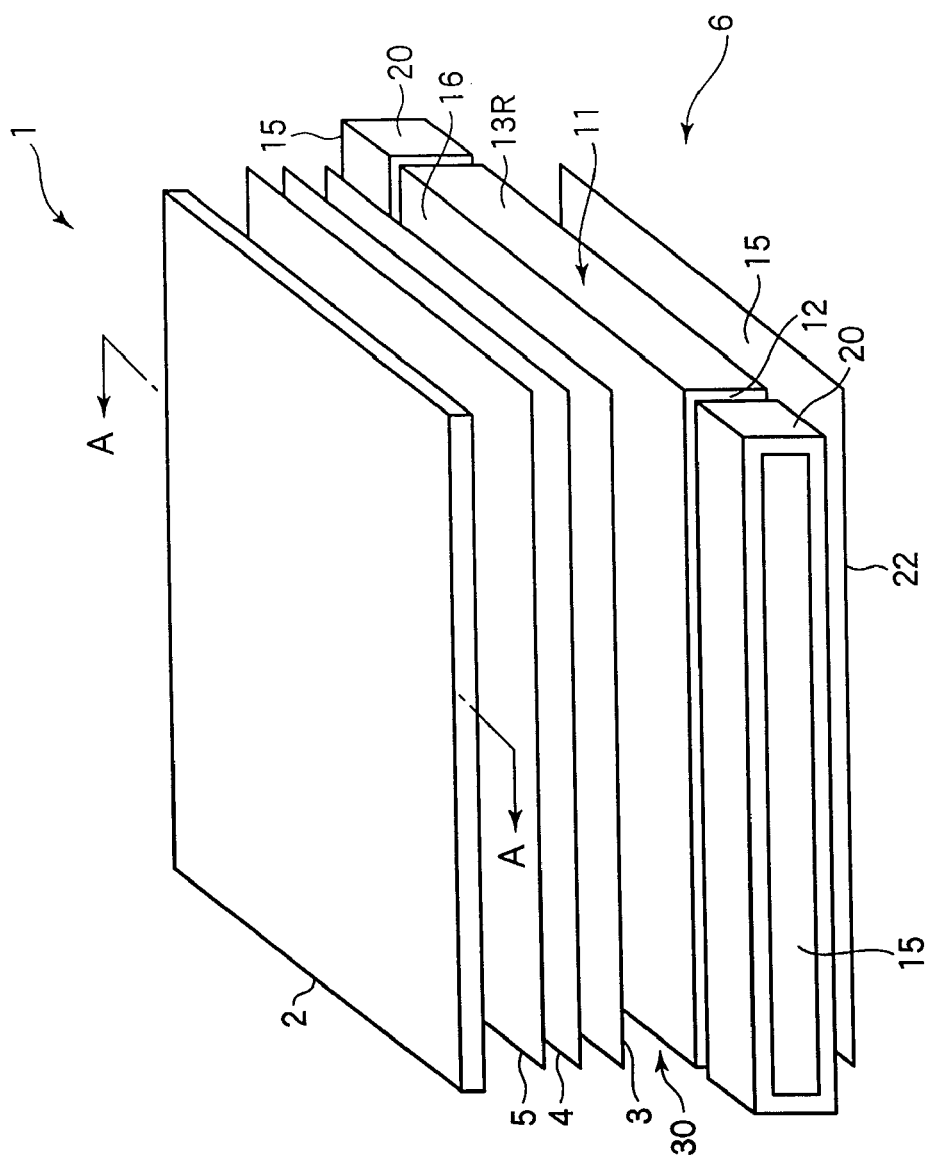
FIG. 1 is an exploded perspective view showing a schematic structure of a liquid crystal display having a backlight unit as a surface illuminator in a mode for carrying out the invention.
Figure 2:
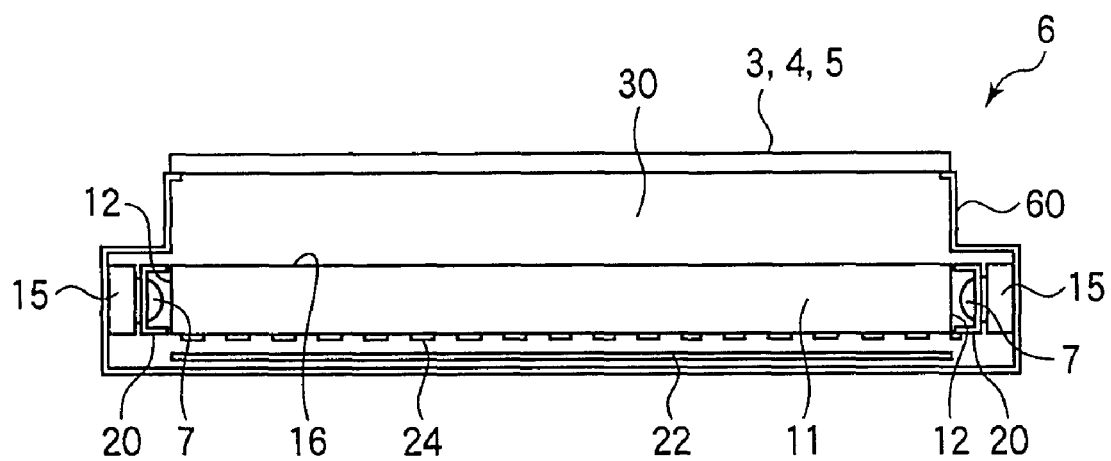
FIG. 2 is a view of a main structure of a backlight unit 6 taken along the line A-A on the liquid crystal display shown in FIG. 1 in the mode for carrying out the invention.

A description will now be made with reference to FIGS. 1 to 29 on a surface illuminator employing an array of discrete light sources and a liquid crystal display having the same in a first mode for carrying out the invention. FIG. 1 is an exploded perspective view showing a schematic structure of a liquid crystal display 1 having a backlight unit 6 as a surface illuminator in the present mode for carrying out the invention. FIG. 2 is a view of a main structure of the backlight unit 6 of the liquid crystal display shown in FIG. 1 taken along the line A-A. As shown in FIGS. 1 and 2, the liquid crystal display 1 in the present mode for carrying out the invention includes a liquid crystal display panel 2 (not shown in FIG. 2) provided by sealing a liquid crystal between a pair of substrates and the backlight unit 6 which is a surface illuminator.

The backlight unit 6 includes a light guide 11 which is constituted by, for example, a transparent member in the form of a rectangular thin plate having a predetermined thickness.

The light guide 11 has a light exit region (hereinafter referred to as a light exit surface) 16 which spreads in the form of a plane on a side of the light guide facing the liquid crystal display panel 2 and from which light exits. The surface of the light guide 11 opposite to the light exit surface 16 is a light scattering surface on which scattering dots 24 serving as a light output portion are printed. A reflective sheet 22 is provided on the side of the light scattering surface of the light guide 11 opposite to the light exit surface 16.

The region sandwiched by the light exit surface 16 of the light guide 11 and the light scattering surface opposite to the same is a light guide region for guiding light to the light exit surface 16. Among four side portions of the light guide around the peripheries of the light exit surface 16 and the light scattering surface, both side portions along two sides of the light guide opposite to each other, e.g., the longer sides thereof, constitute light entrance surfaces 12 through which light enters the light guide region. Two side surfaces of the light guide extending to connect both ends of the two opposite light entrance surfaces 12 respectively constitute reflective surfaces 13 for reflecting light in the light guide region.

LED modules 15 including arrays of discrete light sources are provided on the light entrance surfaces 12 of the light guide 11. The LED modules 15 are formed by alternately and discretely arranging plural types of LEDs 7 emitting beams of light having different emission wavelength spectra along the light entrance surfaces 12. Reflectors (reflective plates) 20 for allowing light from the LED modules 15 to efficiently enter the light guide 11 are provided around the LED modules 15.

A gas space 30 having a predetermined thickness for mixing beams of light from the LED modules 15 is provided between the light guide 11 and the liquid crystal display panel 2. Optical sheets such as a transmissive diffusing plate 3 having a thickness of, for example, about 2 mm and lens sheets 4 and 5 are provided between the gas space 30 and the liquid crystal display panel 2.

As thus described, the backlight unit 6 has a configuration in which the reflective sheet 22, the light guide 11, the gas space 30, and the optical sheets 3, 4, and 5 are provided one over another in the order listed. Those constituent members are secured by a housing 60.

Light mixing and light emitting operations at the backlight unit 6 will now be briefly described. As shown in FIG. 2, beams of light emitted by the LED modules 15 to enter the light entrance surfaces 12 of the light guide 11 are guided through the light guide region and scattered by the scattering dots 24. Some of the beams exit the light exit surface 16 into the gas space 30, and the rest of the beams are reflected by the reflective sheet 22 to return to the light guide region of the light guide 11 and are reflected again by the scattering dots 24 to finally exit the light exit surface 16 into the gas space 30. Those exiting beams are emitted as beams of light traveling in directions which are close to an in-plane direction of the light exit surface 16 and which are at a great angle θ to a direction normal to the light exit surface 16. Therefore, the beams of light which have exited the light exit surface 16 travel in the gas space 30 for some time instead of immediately entering the liquid crystal display panel 2. As a result, a beam of light which has been output and which has not been mixed with beams of light from other LEDs 7 yet in the neighborhood of the light entrance surface 16 is mixed with other beams of light and spread in a wide area of the panel 2 while it travels in the gas space 30. Thus, neither color irregularity nor luminance irregularity will be visually perceived. That is, the gas space 30 has the function of mixing beams of light having different emission wavelength spectra or different quantities of light to make them uniform in an in-plane direction of the backlight unit 6. The optical sheets 3, 4, and 5 have the function of mixing beams of light traveling at different angles at the same point in the plane to re-orient the angles of the beams, thereby making the color and quantity of illuminating light uniform in the plane.

In practice, beams of light exit the light guide 11 in directions which are at considerably great angles (θ=70 to 80°) to the direction normal to the light exit surface 16. When a beam of light which has exited the light guide 11 at a certain exit point is to be made to enter the transmissive diffusing plate 3 after traveling, for example, about 50 mm in an in-plane direction from the exit point, the thickness of the gas space 30 (the distance between the light exit surface 16 and the transmissive diffusing plate 3) must be in the range from 9 to 18 mm. In the present mode for carrying out the invention, the thickness of the gas space 30 is about 15 mm. Since the beam of light is diffused while it travels in the gas space 30 as far as 50 mm, it is subjected to color mixing with other beams of light, and the quantity of the light itself dramatically decreases in a near vertical direction. Thus, the light will be less likely to be visually perceived as an irregularity in color or luminance.

FIG. 3 shows a positional relationship between the light exit surface 16 of the light guide 11 of the backlight unit 6 and the LED modules 15 in the present mode for carrying out the invention in a view of the unit taken in a direction normal to the light exit surface 16. In FIG. 3, the two side surfaces extending opposite to each other along the longer sides of the rectangular light exit surface 16 constitute light entrance surfaces 12T and 12B, and the two side surfaces extending opposite to each other along the shorter sides constitute reflective surfaces 13R and 13L.

A plurality of LED sets (hereinafter also referred to as "GRB" sets as occasion demands) 10 are arranged in series along the light entrance surfaces 12T and 12B of the light guide 11 starting in the neighborhood of the left ends of the light entrance surfaces 12T and 12B, each set consisting of a G (green) emission LED 7G, an R (red) emission LED 7R, and a B (blue) emission LED 7B provided in series in the order listed at substantially equal intervals.

The reflective surfaces 13L and 13R extending from both ends of the two light entrance surfaces 12T and 12B are mirror-finished to improve the efficiency of regular reflection of light from the LED modules 15. Reflective sheets 14 may be disposed on back sides of the reflective surfaces 13L and 13R (the outside of the reflective surfaces 13L and 13R) to return light which has passed through the reflective surfaces 13L and 13R into the light guide region. The invention is not limited to such a configuration, and the reflective surfaces 13L and 13R may alternatively be provided by depositing or applying reflective films on polished surfaces. Further, the present mode for carrying out the invention is applicable even when the reflective surfaces 13L and 13R are rough cut surfaces which have not been mirror-finished.

In the positional relationship between the LED modules 15 and the light entrance surfaces 12T and 12B in such a configuration, at an arbitrary point inside the light exit surface 16, beams of light from an LED 7G, an LED 7R, and an LED 7B in the neighborhood of the arbitrary point can be mixed to generate a beam of light in a desired color.

Light arriving at an arbitrary point located in the neighborhood of the left end of the light entrance surface 12T includes not only direct light from the "GRB" set 10 at the left end of the light entrance surface 12T but also light from a "BRG" set 10' which is a mirror image of the light from the "GRB" set 10 projected on the reflective surface 13L. As a result, G, R, and B beams of light arrive at the neighborhood of the arbitrary point from the right side of the reflective surface 13L, and G, R, and B beams of light also arrive there from the left side of the reflective surface 13L. That is, the result is equivalent to arranging one set of LEDs or six LEDs in B, R, G, G, R, and B in the order listed from the left side in the figure in the neighborhood of the arbitrary point near the top of the reflective plate 13L. Since beams of light from four LEDs among the LED set closer to the arbitrary point, i.e., beams from an "RGGR" set are mixed with each other at relatively high intensity, there will be no "B" beam at all.

In order to make the shortage of blue components at the arbitrary point relatively small, control is performed to make the light output of the LED 7R in the "GRB" set 10 at the left end of the light entrance surface 12T smaller than that of other LEDs 7R. An LED driving circuit, which is not shown, in the LED module 15 supplies the LED 7R in the "GRB" set 10 at the left end of the light entrance surface 12T with a current which is smaller than a current supplied to the LEDs 7R in other LED sets 10 by a predetermined amount. Thus, the LED 7R at the left end of the light entrance surface 12T can be made to emit a quantity of light smaller than that from the other LEDs 7R by a predetermined amount.

Thus, overemphasis on red can be suppressed to prevent color irregularities, which makes it possible to obtain well-balanced white light and to reduce color irregularities in the neighborhood of the top end of the reflective surface 13L significantly. The same configuration also makes it possible to reduce color irregularities in the neighborhood of the bottom end of the reflective surface 13L and in the neighborhoods of the top and bottom ends of the reflective surface 13R significantly.

Specific configurations of the LED modules 15 which allow color irregularities to be reduced will now be described with reference to various embodiments of the invention.

EMBODIMENT 1

Figures 4A, 4B:
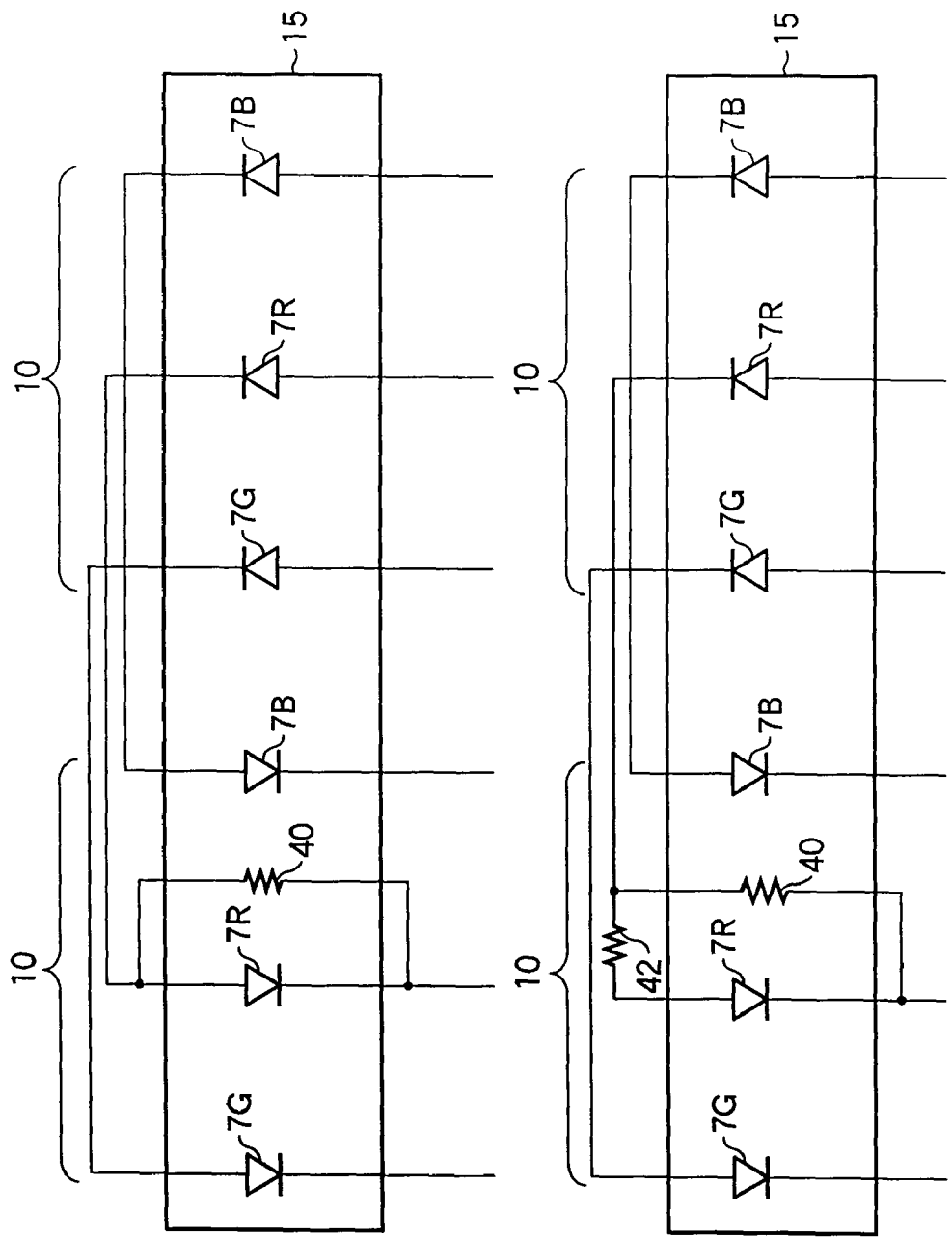
FIGS. 4A and 4B show schematic configurations of an LED module according to Embodiment 1 in the mode for carrying out the invention.

FIGS. 4A and 4B show schematic configurations of an LED module 15 according to Embodiment 1 in the present mode for carrying out the invention. FIG. 4A shows a "GRB" set 10 at the left end of the light entrance surface 12T and another "GRB" set 10 adjacent to the same by way of example. In the LED module 15, G (green) emission LEDs 7G are series connected to each other. Similarly, series connection is provided between R (red) emission LEDs 7R and between B (blue) emission LEDs 7B. LED drivers for supplying a current to the series-connected LEDs in each color are omitted in the illustration.

A resistor 40 for correcting a color irregularity (color irregularity correcting resistor) is connected in parallel with the LED 7R in the "GRB" set 10 at the left end of the light entrance surface 12T. The color irregularity correcting resistor 40 serves as a current-bypass resistor for the LED 7R at the left end of the light entrance surface 12T. When the resistance of the color irregularity correcting resistor 40 is set at 10Ω (ohms) or lower, substantially no current flows through the LED 7R at the left end of the light entrance surface 12T. The resistance of the color irregularity correcting resistor 40 is therefore preferably in the range from about 10Ω to about 30Ω, inclusive.

As thus described, according to the present embodiment, a color irregularity correcting resistor is connected in parallel with an LED which can cause an irregularity in color or luminance. As a result, a current bypasses the LED through which the current is otherwise to flow. Thus, the amount of current passed through the LED can be suppressed to reduce the light output of the LED, which allows an irregularity in color or luminance to be adjusted.

FIG. 4B shows a modification of the configuration in FIG. 4A. The configuration shown in FIG. 4A is unsuitable for correction of a subtle color irregularity because the resistance of the color irregularity correcting resistor 40 is small. Further, it is difficult to correct any variation in performance between LEDs further. As a solution to this, a second color irregularity correcting resistor 42 is connected in series with an LED which can cause an irregularity in color or luminance (the LED 7R at the left end of the light entrance surface 12T in the present embodiment) as shown in FIG. 4B to control the value of a current passed through the LED precisely through resistance division between the resistor and the color irregularity correcting resistor 40. This configuration allows a color irregularity to be corrected more precisely than the configuration shown in FIG. 4A.

EMBODIMENT 2

FIGS. 5A and 5B show schematic configurations of an LED module 15 according to Embodiment 2 in the present mode for carrying out the invention. FIG. 5A shows a "GRB" set 10 at the left end of the light entrance surface 12T and another "GRB" set 10 adjacent to the same by way of example. In the following embodiments, a feature identical in operation and effect to a feature which has already been described will be indicated by the same reference numeral as assigned to the latter and will not be described. The configuration shown in FIG. 5A is characterized in that a color irregularity correcting resistor 41 constituted by a variable resistor is used instead of the color irregularity correcting resistor 40 in Embodiment 1. It is difficult for a color irregularity correcting resistor that is a fixed resistor as described in Embodiment 1 to correct even variations in performance between LEDs. However, each LED can be separately and appropriately corrected by replacing the resistor with a variable resistor.

FIG. 5B shows a modification of the configuration in FIG. 5A. A configuration is shown, in which a second color irregularity correcting resistor 42 is connected in series with an LED which can cause an irregularity in color or luminance to control the value of a current passed through the LED precisely through resistance division between the resistor 42 and the color irregularity correcting resistor 41.

EMBODIMENT 3

Figures 6A, 6B:
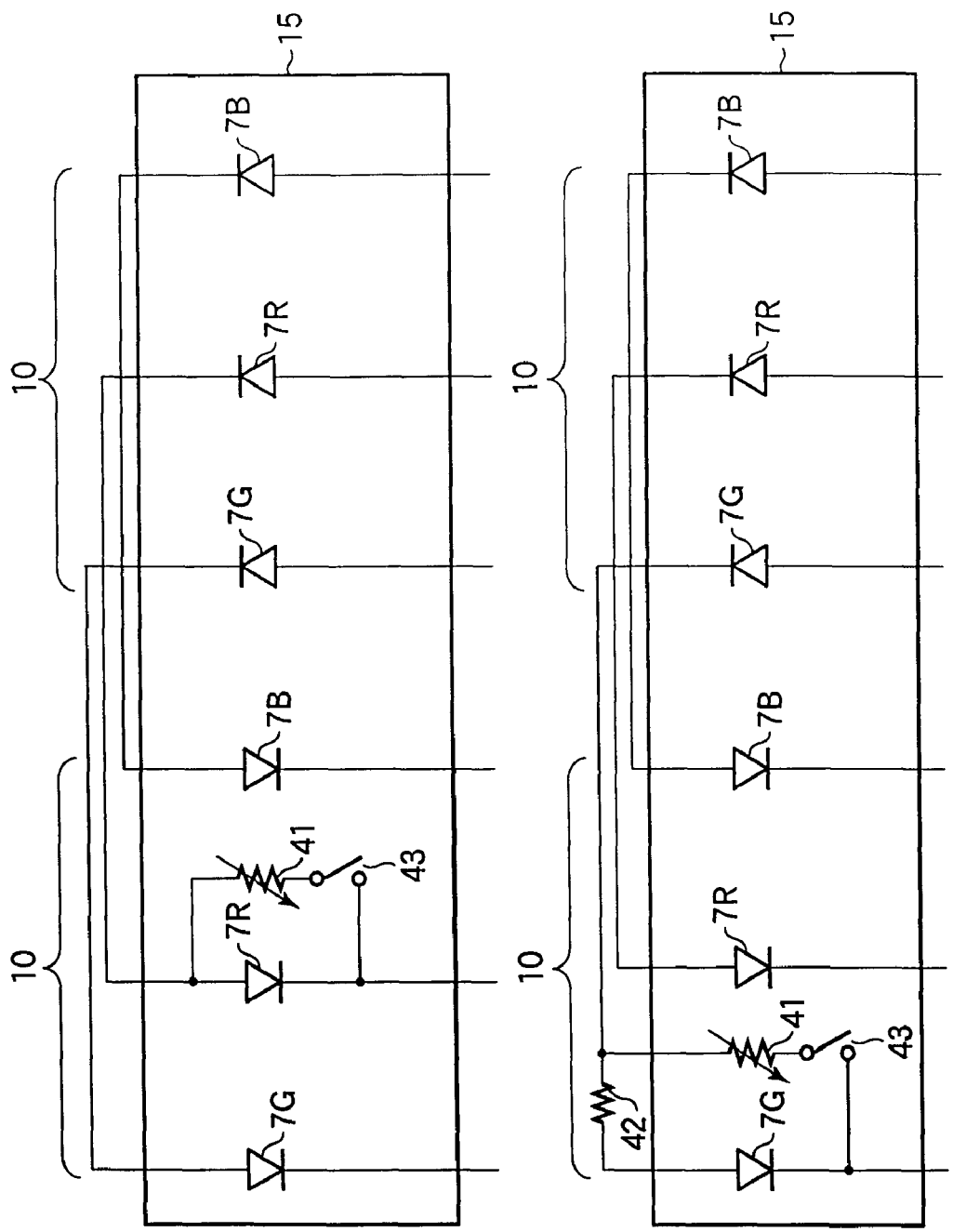
FIGS. 6A and 6B show schematic configurations of an LED module according to Embodiment 3 in the mode for carrying out the invention.

FIGS. 6A and 6B show schematic configurations of an LED module 15 according to Embodiment 3 in the present mode for carrying out the invention. FIG. 6A shows a "GRB" set 10 at the left end of the light entrance surface 12T (the end of the surface 12T on the side of the reflective surface 13L) and another "GRB" set 10 adjacent to the same by way of example. The configuration of the present embodiment is characterized in that a switch 43 is provided for a color irregularity correcting resistor 40 or 41 (the resistor 41 is shown by way of example) to serve as a current bypass. When it is not necessary to control the light output of the LED, the current bypass function can be disabled by turning the switch 43 off.

FIG. 6B shows a modification of the configuration in FIG. 6A. Irregularities in color or luminance occur primarily at four corners of the light exit surface 16. Therefore, correction of color irregularities may be performed only at the four corners of the light exit surface 16 in consideration to the cost. Therefore, when a cost reduction is desired, the color irregularity correcting resistors 40 and 41 may be provided at only one of the three LEDs at the end of the LED module 15. For example, when the chromaticity x of an x-y chromaticity coordinate at the end of the light entrance surface 12T on the side of the reflective surface 13L is to be adjusted, the color irregularity correcting resistors may be provided at the red LED 7R. When the chromaticity y is to be adjusted, the color irregularity correcting resistors may be provided at the green LED 7G. The present modification represents an example in which the chromaticity y is adjusted by connecting the color irregularity correcting resistor 41 in parallel with an LED which can cause an irregularity in color or luminance (e.g., the LED 7G on the left end of the light entrance surface 12T), connecting the second color irregularity correcting resistor 42 in series therewith, and providing the switch 43 at the color irregularity correcting resistor 41.

EMBODIMENT 4

Figures 7A, 7B:
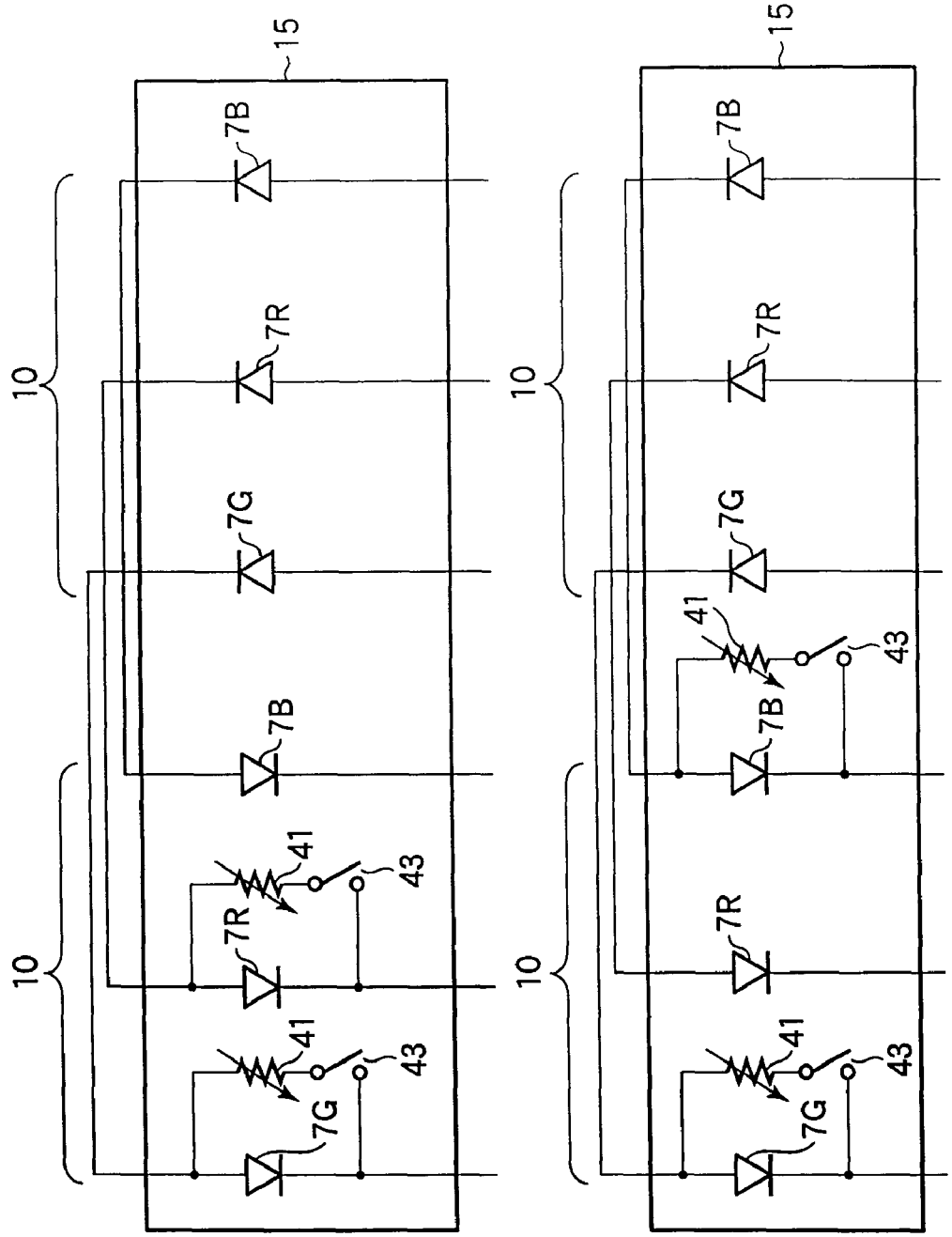
FIGS. 7A and 7B show schematic configurations of an LED module according to Embodiment 4 in the mode for carrying out the invention.

FIGS. 7A and 7B show schematic configurations of an LED module 15 according to Embodiment 4 in the present mode for carrying out the invention. FIG. 7A shows a configuration which is similar to a combination of the configurations of Embodiment 3 shown in FIGS. 6A and 6B and in which the color irregularity correcting resistor 41 is provided at each of the two LEDs 7G and 7R among the three LEDs at the end of the LED module 15 on the side of the reflective surface 13. Thus, the chromaticity x can be adjusted by adjusting the resistance of the color irregularity correcting resistor 41 for the red LED 7R, and the chromaticity y can be adjusted by adjusting the resistance of the color irregularity correcting resistor 41 for the green LED 7G. Each of the switches 43 may be turned off when there is no need for color irregularity correction.

FIG. 7B shows a modification of the configuration in FIG. 7A. A configuration is shown, in which the color irregularity correcting resistors 40 and 41 are provided at the two LEDs 7G and 7B among the three LEDs at the end of the LED module 15 on the side of the reflective surface 13, respectively. In this case, a color irregularity can be corrected in the same way as in the configuration of FIG. 7A.

EMBODIMENT 5

Figure 8:
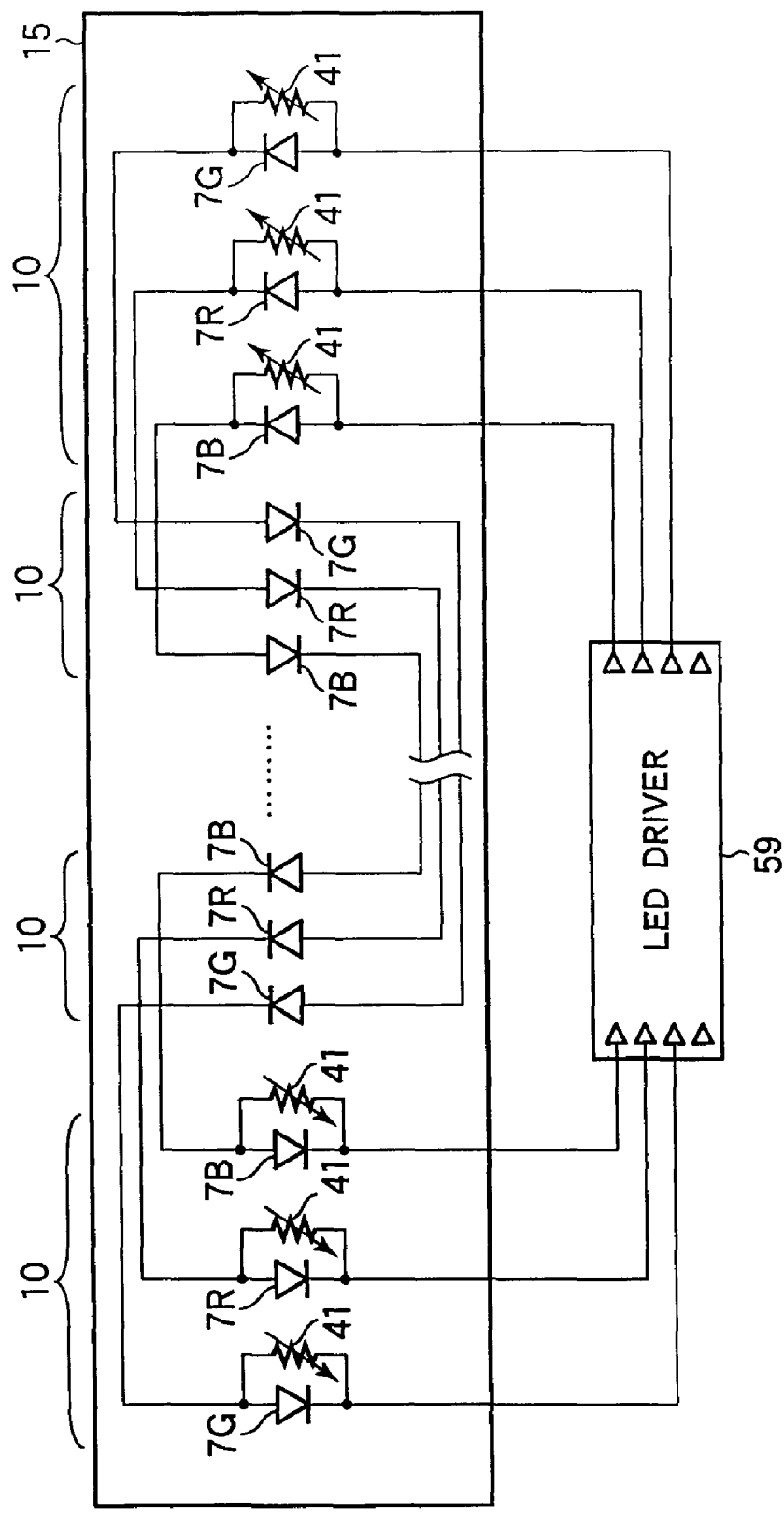
FIG. 8 shows a schematic configuration of an LED module according to Embodiment 5 in the mode for carrying out the invention.

FIG. 8 shows a schematic configuration of an LED module 15 according to Embodiment 5 in the present mode for carrying out the invention. FIG. 8 shows an example of a configuration in which the color irregularity correcting resistor 41 is provided at each of three (the quantity may alternatively be a multiple of 3) LEDs 7G, 7R, and 7B at the ends of the LED module 15 on the sides of the reflective surfaces 13L and 13R. Since the uniformity of a color cannot be perceived by human eyes without minutely correcting the balance of the three primary colors, a configuration is employed, in which the color irregularity correcting resistor 41 is provided at each of the three LEDs 7 on both ends of the LED module 15. As a result, a color irregularity can be precisely corrected. A current is supplied from an LED driver 59 to the LEDs 7 in each color which are connected in series.

EMBODIMENT 6

Figure 9:
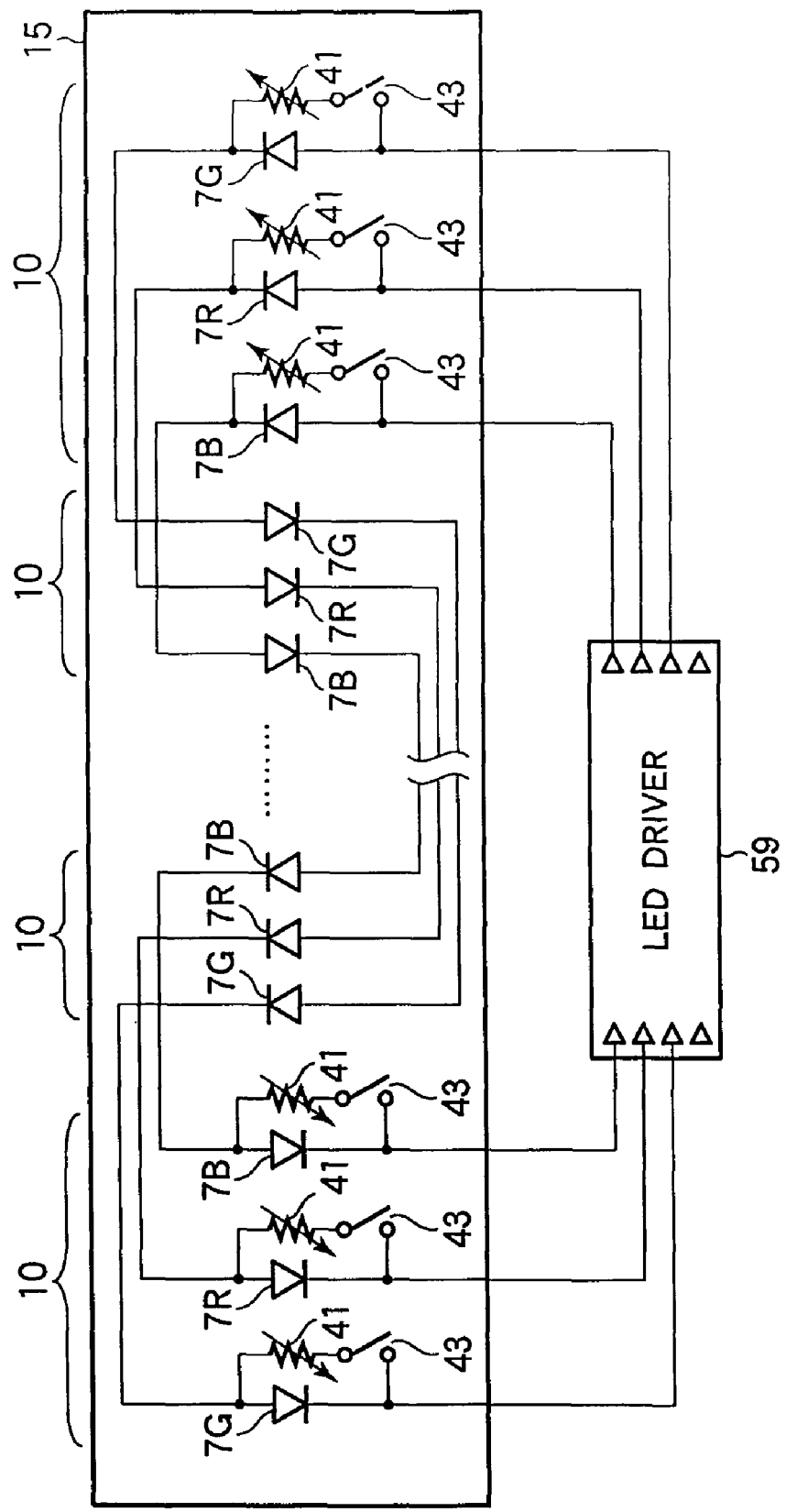
FIG. 9 shows a schematic configuration of an LED module according to Embodiment 6 in the mode for carrying out the invention.

FIG. 9 shows a schematic configuration of an LED module 15 according to Embodiment 6 in the present mode for carrying out the invention. FIG. 9 is characterized in that switches 43 are provided in the configuration of Embodiment 5 to serve the color irregularity correcting resistors 41 used as current bypasses. When there is no need for controlling the light output of the LEDs, the switches 43 may be turned off to disable the current bypass function. As a result, it is possible to prevent the LEDs from becoming dim and consequently causing irregularity in luminance due to the current bypass function when there is no need for color irregularity correction.

EMBODIMENT 7

Figure 10:
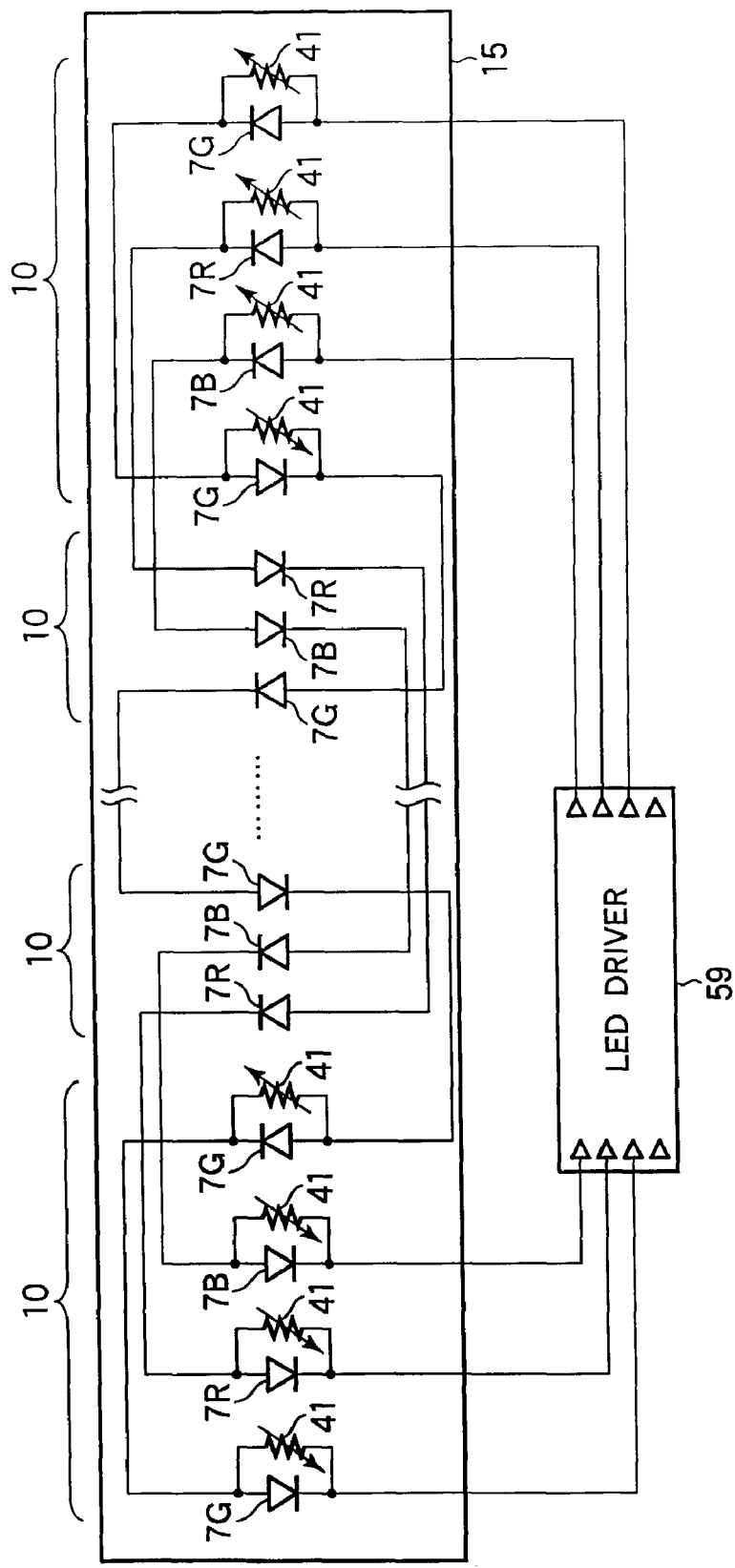
FIG. 10 shows a schematic configuration of an LED module according to Embodiment 7 in the mode for carrying out the invention.

FIG. 10 shows a schematic configuration of an LED module 15 according to Embodiment 7 in the present mode for carrying out the invention. FIG. 10 shows an example of an application of the present mode of the invention to a configuration in which LED sets 10 constituted by sets of four LEDs, e.g., "GRBG" sets including two "G" LEDs as minimum unit arrays are provided at the ends of the LED module 15 on the sides of the reflective surfaces 13L and 13R.

When LEDs 7R, 7G, and 7B in the three primary colors are used, color irregularities can be easily corrected by providing yellow components at both ends of the LED module 15. It is therefore preferable to dispose a red or green LED 7R or 7G on both ends of the module. However, since there are significant variations in luminance between individual red or green LEDs, significant variations occur in correction when the correction is made by the color irregularity correcting resistors. Further, since there are significant variations in deterioration of LEDs 7, color irregularities occur as time passes because of the influence of red and green LEDs 7R and 7G which have high luminance. For this reason, a configuration is employed, in which LEDs 7 (LEDs 7G in the figure) in the same color as the LEDs at both ends of the LED module 15 are provided in the fourth places from the respective ends to correct any color irregularity using two LEDs 7 and to thereby reduce variations in luminance attributable to deterioration of LEDs. The same advantage can be achieved by putting LEDs 7 in the same color in the second and fifth places from both ends of the LED module 15.

EMBODIMENT 8

Figure 11:
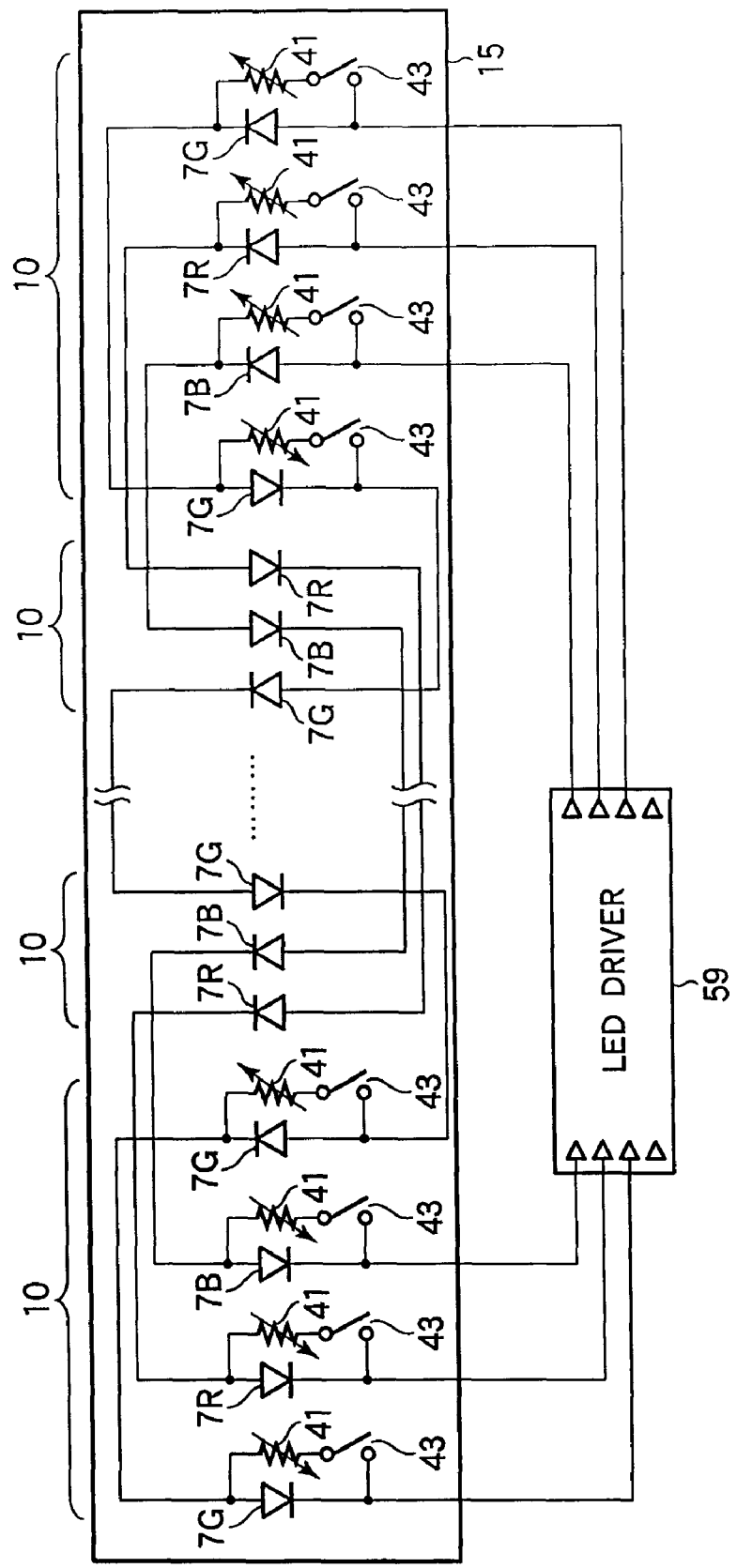
FIG. 11 shows a schematic configuration of an LED module according to Embodiment 8 in the mode for carrying out the invention.

FIG. 11 shows a schematic configuration of an LED module 15b according to Embodiment 8 in the present mode for carrying out the invention. FIG. 11 is characterized in that switches 43 are provided in the configuration of Embodiment 7 to serve the color irregularity correcting resistors 41 used as current bypasses.

EMBODIMENT 9

Figure 12:
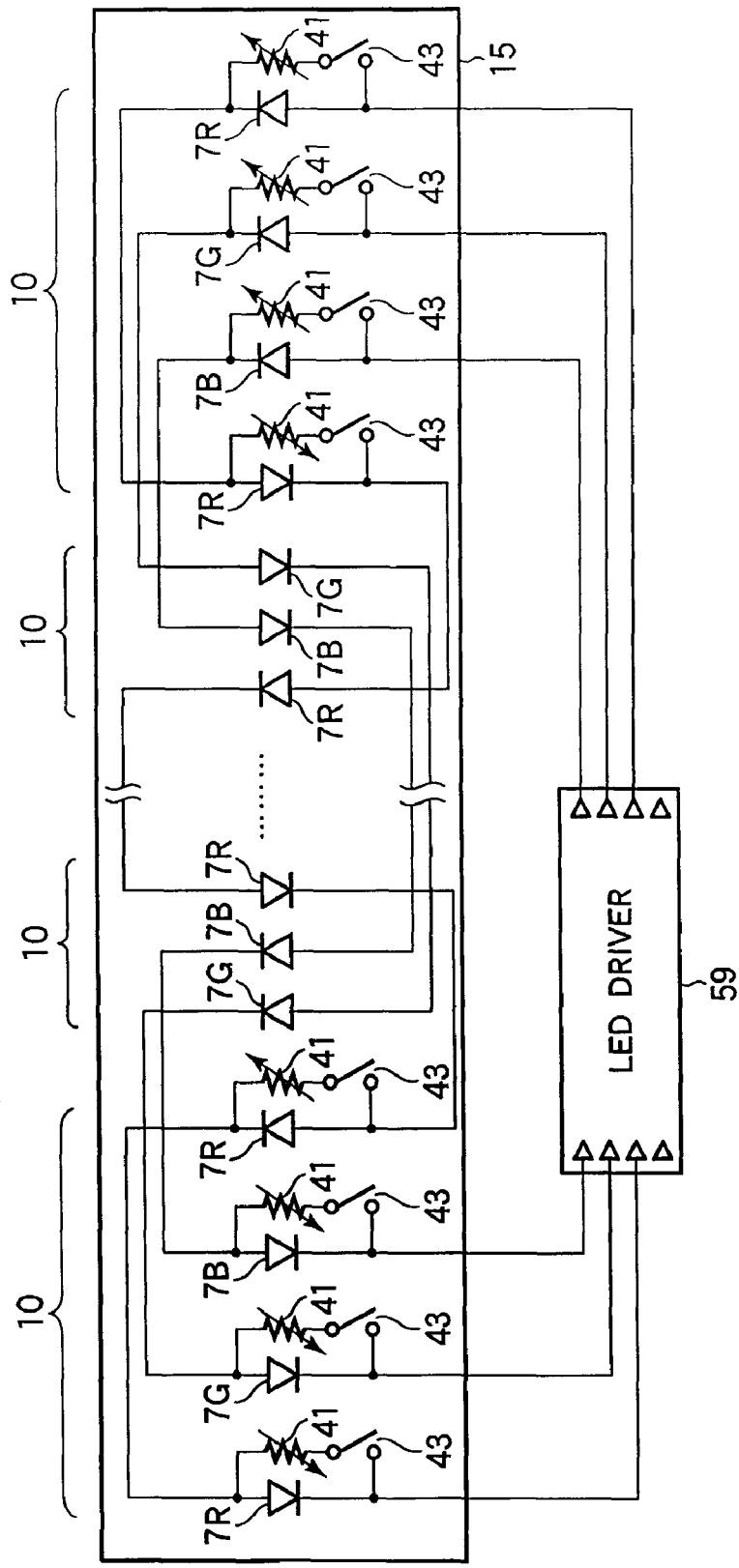
FIG. 12 shows a schematic configuration of an LED module according to Embodiment 9 in the mode for carrying out the invention.

FIG. 12 shows a schematic configuration of an LED module 15 according to Embodiment 9 in the present mode for carrying out the invention. FIG. 12 is characterized in that four LEDs in red, green, blue, red are arranged in the order listed starting at an end of the LED module 15 on the side of a reflective surface 13. The inventors found that the irregularity of the color of the LED array can be made small by arranging LEDs in green, red, blue, and green or in green, blue, red, and green from the end as shown in FIG. 11 representing Embodiment 8. It was also found that the color irregularity can be made small by arranging LEDs in red, green, blue, and red. It was also found that a significant color irregularity conversely occurs when blue LEDs are provided at both ends of such an array.

EMBODIMENT 10

Figure 13:
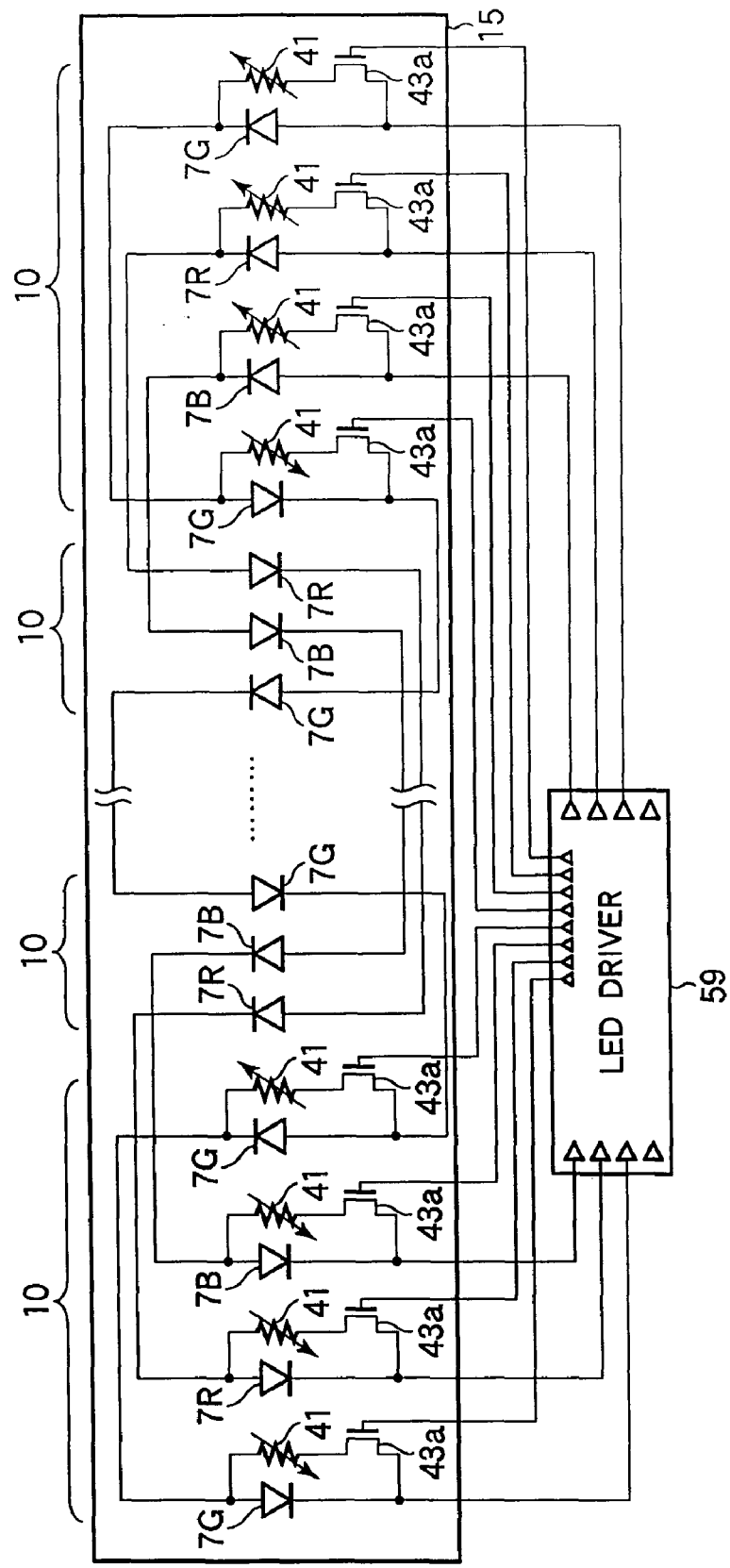
FIG. 13 shows a schematic configuration of an LED module according to Embodiment 10 in the mode for carrying out the invention.

FIG. 13 shows a schematic configuration of an LED module 15 according to Embodiment 10 in the present mode for carrying out the invention. FIG. 13 is characterized in that the switches 43 in Embodiment 8 are replaced with transistors 43a. Since electrical control allows a correction to be made more easily, the efficiency of manufacturing and the accuracy of adjustment can be improved by replacing the color irregularity correcting resistors with electronic resistors.

EMBODIMENT 11

Figure 14:
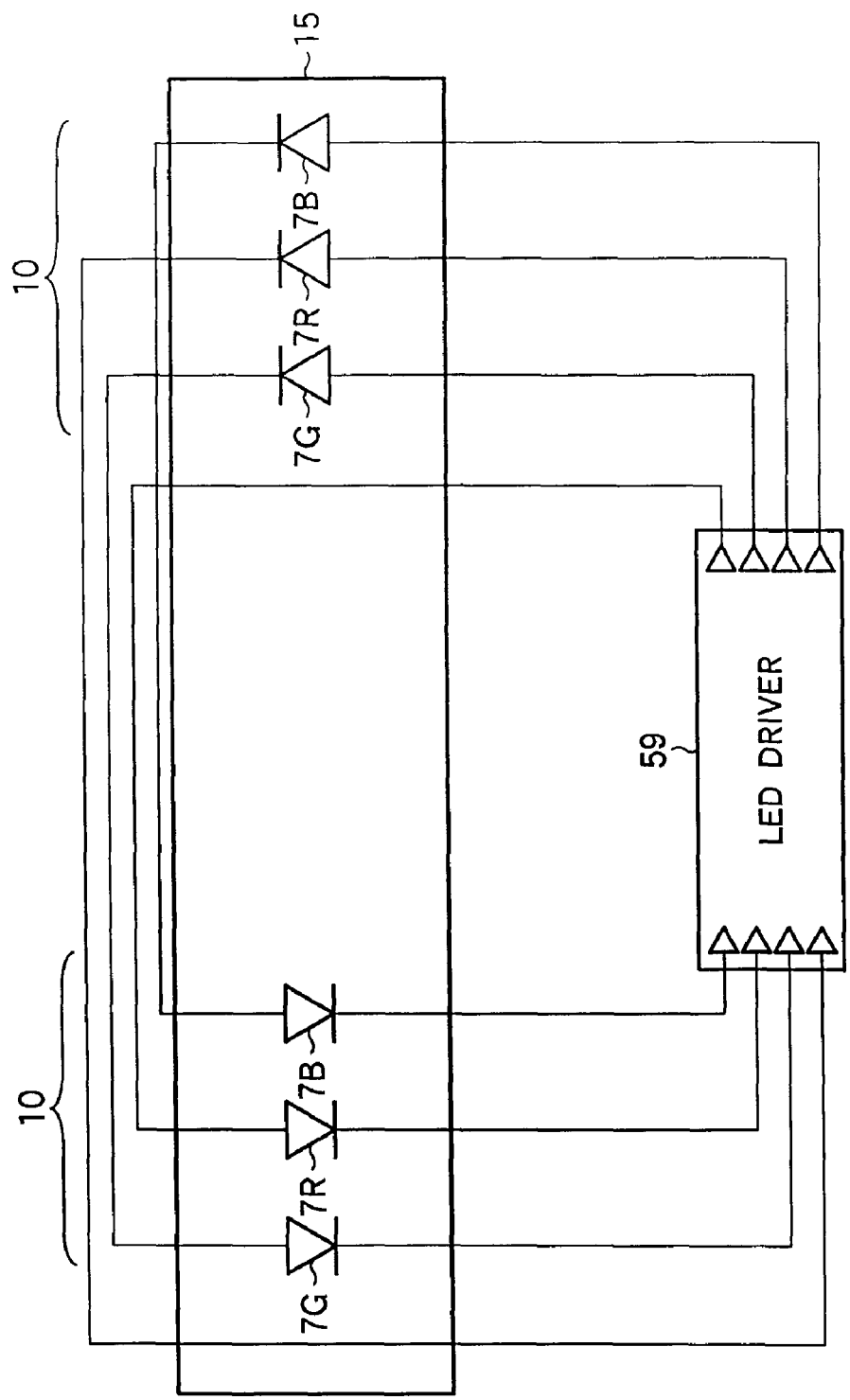
FIG. 14 shows a schematic configuration of an LED module according to Embodiment 11 in the mode for carrying out the invention.

FIG. 14 shows a schematic configuration of an LED module 15 according to Embodiment 11 in the present mode for carrying out the invention. FIG. 14 shows a configuration in which at least one of three each LEDs, i.e., LEDs 7G, 7R, and 7B at both ends of the LED module 15 on the sides of the reflective surfaces 13 (the LED 7R in the figure) is separately driven. The LEDs 7G and 7B are driven along with respective LEDs in the same colors connected in series therewith, whereas each of the LEDs 7R at the ends of the module on the sides of the reflective surfaces 13 is separately driven. The LED module 15 normally carries forty or more LEDs 7, and LEDs 7G, 7R, and 7B in three colors are driven by three wiring systems or four wiring systems (including two systems for green). The present embodiment has a configuration in which at least one of the three LEDs 7 at both ends is driven by a separate current, whereby any irregularity in color is corrected through control over current values.

EMBODIMENT 12

Figure 15:
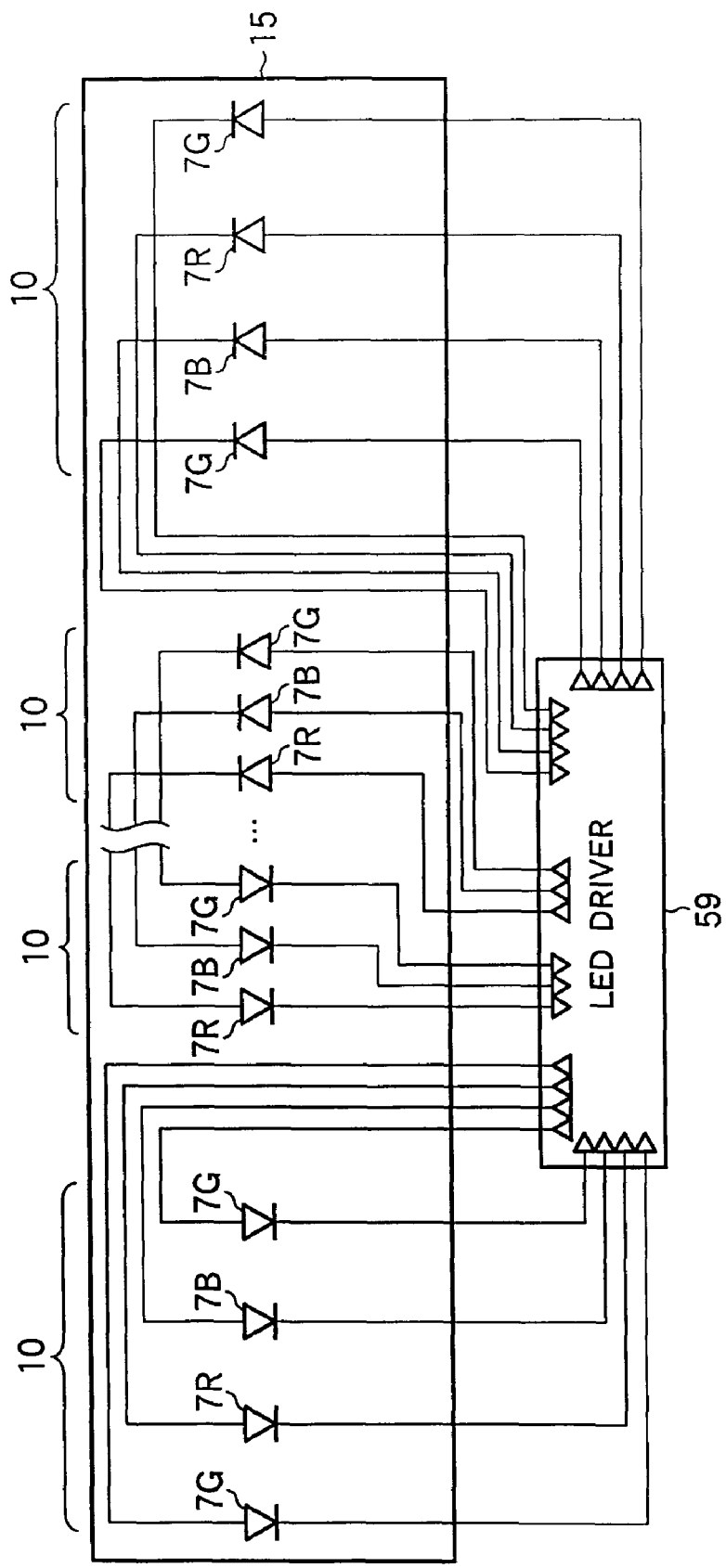
FIG. 15 shows a schematic configuration of an LED module according to Embodiment 12 in the mode for carrying out the invention.

FIG. 15 shows a schematic configuration of an LED module 15 according to Embodiment 12 in the present mode for carrying out the invention. FIG. 15 shows a configuration similar to that of Embodiment 11 in which currents through four systems on both ends of the LED module 15 are separately controlled to correct color irregularities. Further, LEDs 7 (LEDs 7G in the figure) in the same color as the LEDs on both ends are provided in the fourth places from the respective ends in the same manner as in Embodiment 7 taking variations in the deterioration of LEDs 7 into consideration. It is therefore possible to correct a color irregularity of green using two LEDs 7G provided at an end of the module and the fourth place from the same. The same advantage can be achieved by providing LEDs 7 in the same color at the second and fifth places from both ends of the LED module 15.

EMBODIMENT 13

Figure 16:
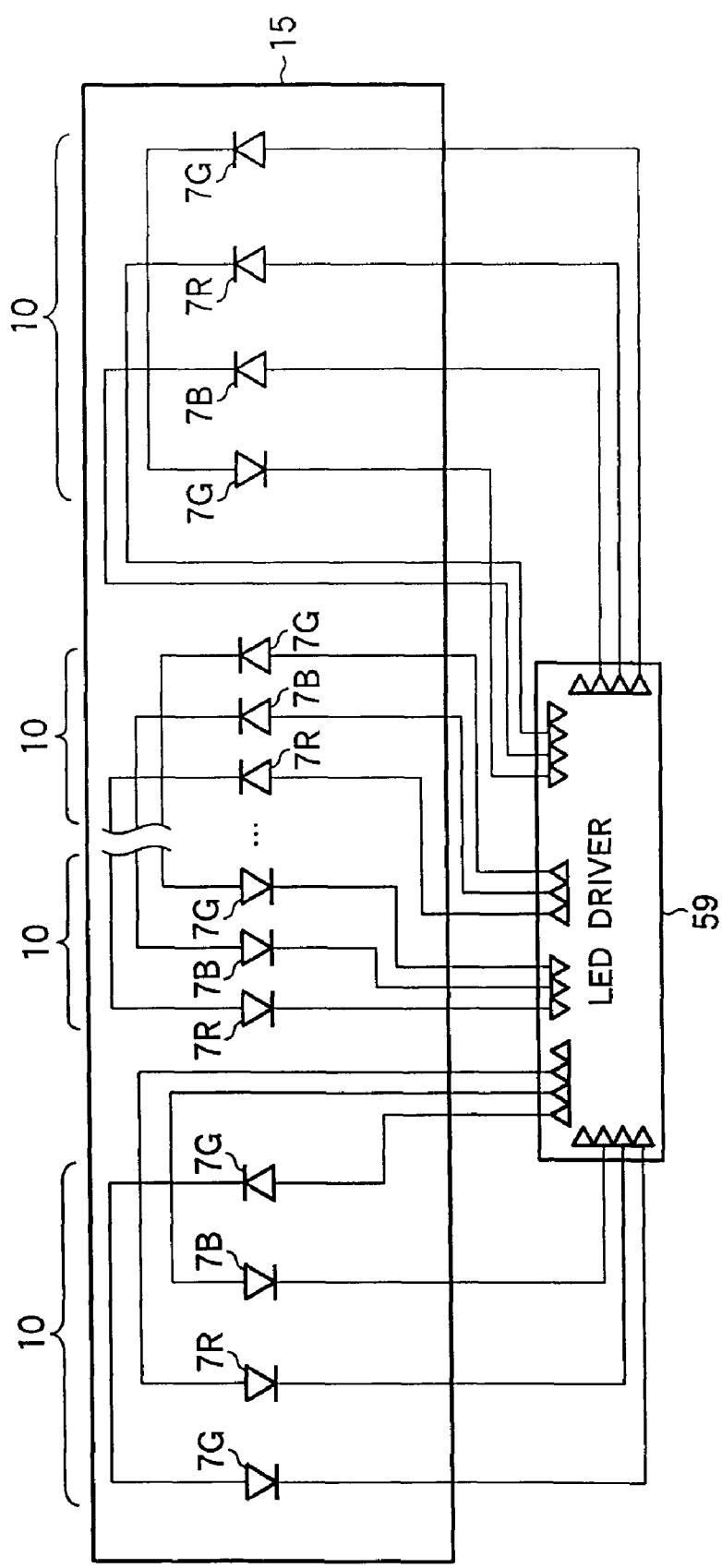
FIG. 16 shows a schematic configuration of an LED module according to Embodiment 13 in the mode for carrying out the invention.

FIG. 16 shows a schematic configuration of an LED module 15 according to Embodiment 13 in the present mode for carrying out the invention. FIG. 16 shows a configuration which is similar to that of Embodiment 12 except that the two LEDs 7G at provided an end of the module and the fourth place from the end are connected in series to reduce the driving systems for green, thereby reducing the number of separate driving systems.

EMBODIMENT 14

Figure 17:
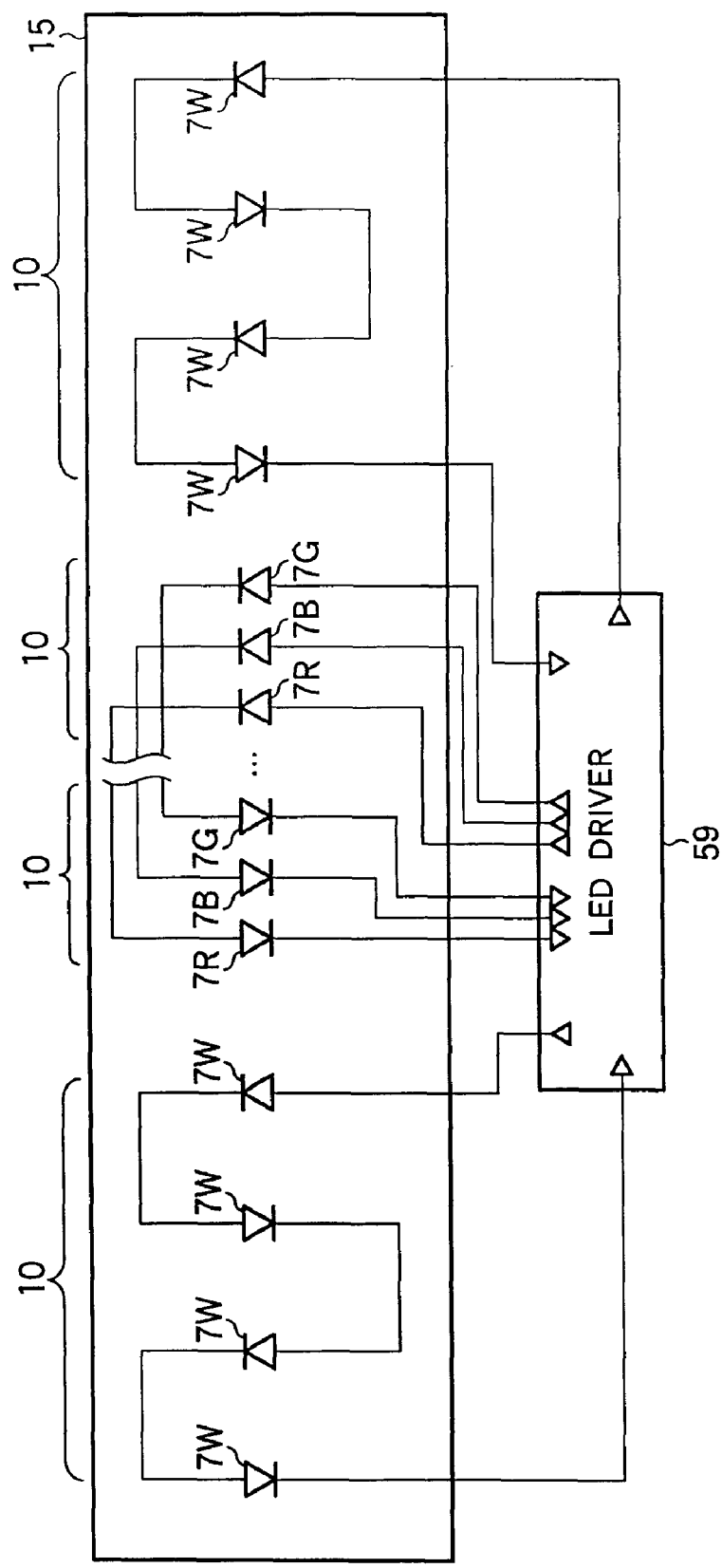
FIG. 17 shows a schematic configuration of an LED module according to Embodiment 14 in the mode for carrying out the invention.

FIG. 17 shows a schematic configuration of an LED module 15 according to Embodiment 14 in the present mode for carrying out the invention. FIG. 17 is characterized in that four each white LEDs 7W are provided at both ends of the LED module 15. White LEDs are used as LEDs 7 dominating the distribution of color at the four corners of an LED backlight unit 2 where color irregularities are likely to occur, which allows the unit 2 can be provided at a low cost and high quality. The four each white LEDs 7W at both ends are connected in series at the respective ends, and current control is performed to keep their luminance uniform.

EMBODIMENT 15

Figure 18:
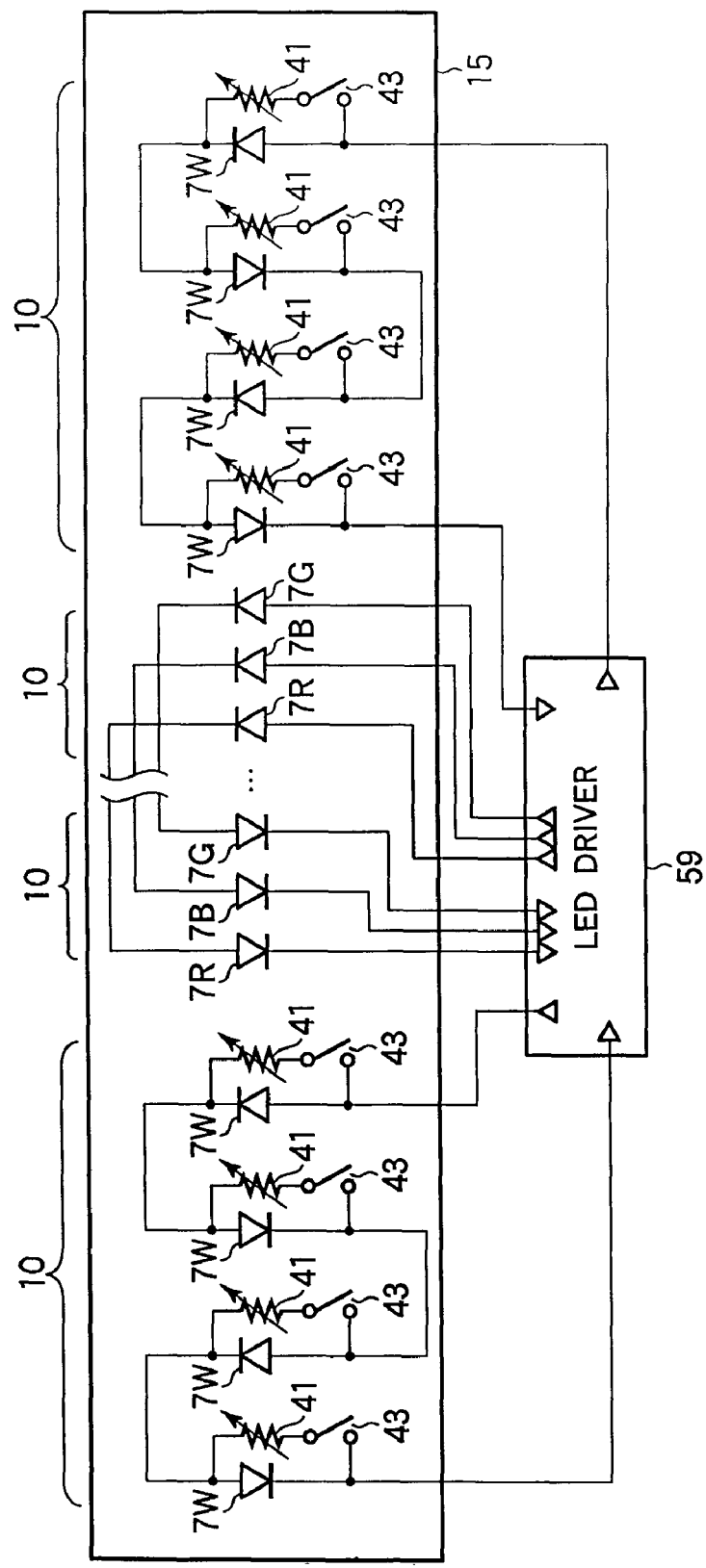
FIG. 18 shows a schematic configuration of an LED module according to Embodiment 15 in the mode for carrying out the invention.

FIG. 18 shows a schematic configuration of an LED module 15 according to Embodiment 15 in the present mode for carrying out the invention. The configuration shown in FIG. 18 is a modification of the configuration of Embodiment 14, and it is an example of a configuration in which a color irregularity correcting resistor 41 (which corrects an irregularity in luminance in this case) is provided at each of the four LEDs 7W at the ends of the LED module 15 on the sides of the reflective surfaces 13L and 13R.

EMBODIMENT 16

Figure 19:
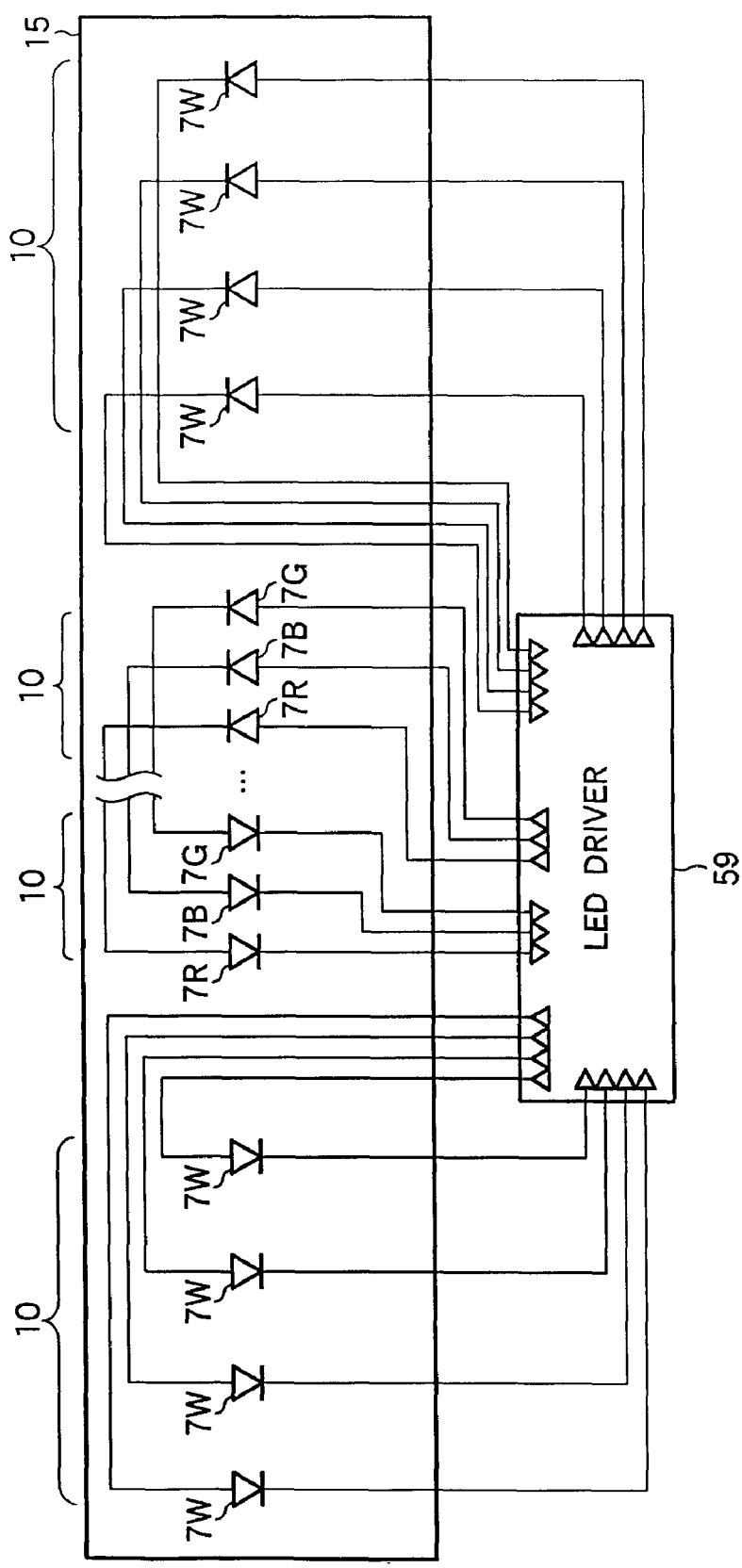
FIG. 19 shows a schematic configuration of an LED module according to Embodiment 16 in the mode for carrying out the invention.

FIG. 19 shows a schematic configuration of an LED module 15 according to Embodiment 16 in the present mode for carrying out the invention. A configuration is shown, in which the currents through the white LEDs 7W are separately controlled by the LED driver 59 to correct luminance.

EMBODIMENT 17

Figure 20:
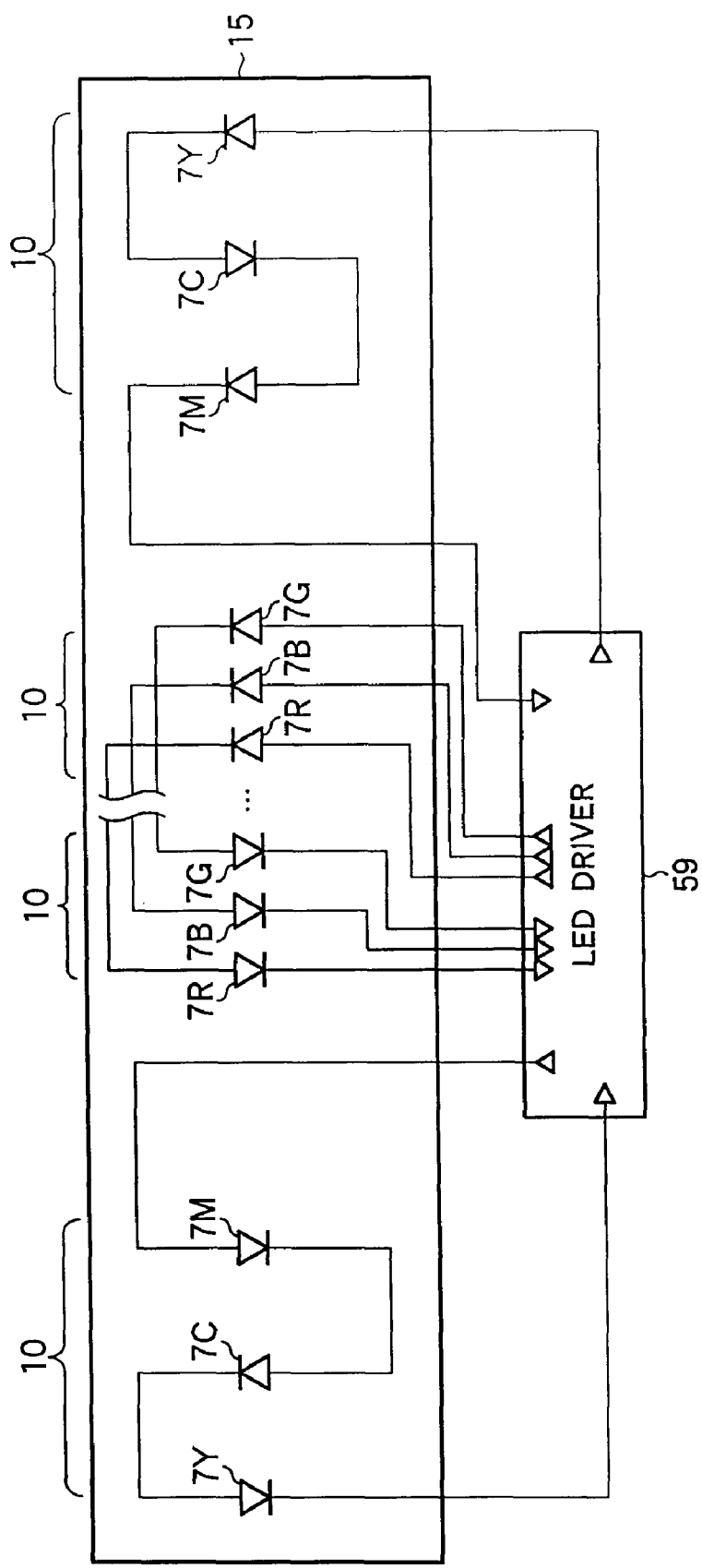
FIG. 20 shows a schematic configuration of an LED module according to Embodiment 17 in the mode for carrying out the invention.

FIG. 20 shows a schematic configuration of an LED module 15 according to Embodiment 17 in the present mode for carrying out the invention. As seen in the description of Embodiment 7, it is desirable that an LED module 15 have yellow components at both ends thereof. For this reason, in the present embodiment, a yellow LED 7Y, a cyan LED 7C, and a magenta LED 7M are provided in the order listed from both ends of the LED module 15, and LEDs 7R, 7G, and 7B in red, green, and blue are alternately and discretely provided along the light entrance surface 12 starting at the fourth places from the respective ends.

EMBODIMENT 18

Figure 21:
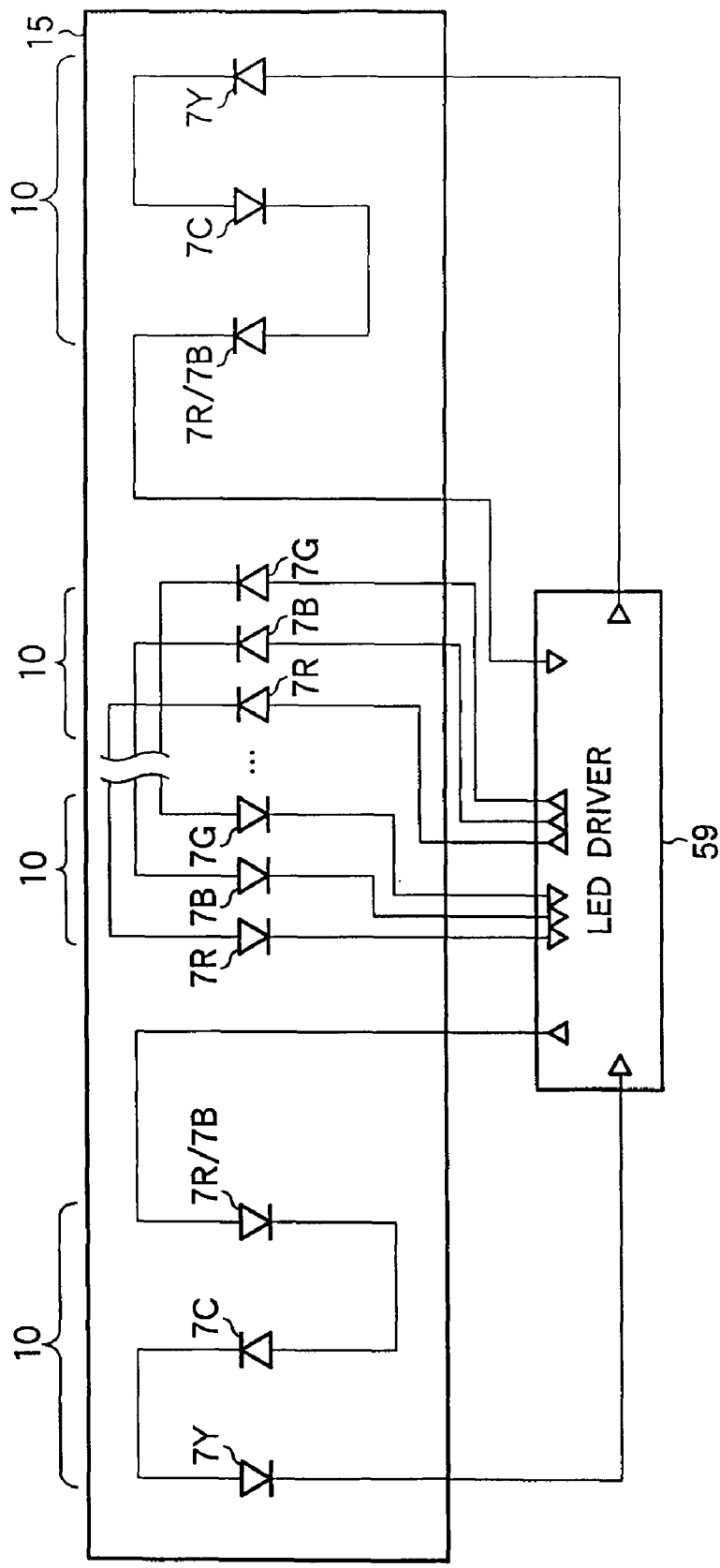
FIG. 21 shows a schematic configuration of an LED module according to Embodiment 18 in the mode for carrying out the invention.

FIG. 21 shows a schematic configuration of an LED module 15 according to Embodiment 18 in the present mode for carrying out the invention. The present embodiment is characterized in that it has a configuration in which LEDs 7 in two out of three colors, i.e., yellow, cyan, and magenta are provided at an end of the module on the side of a reflective surface 13; a red or blue LED 7 is provided in the third place from the end on the side of the reflective surface 13; and red, green, and blue LEDs are alternately and discretely provided along the light entrance surface 12 starting at the fourth place from the end on the side of the reflective surface 13. For example, in the configuration shown in FIG. 21, two colors (yellow and cyan) are selected from among yellow, cyan, and magenta, and one (red or blue) is selected from among the three primary colors. Yellow is an intermediate color between red and green, and cyan is an intermediate color between green and blue. Since a shortage of red components or blue components therefore occurs when yellow and cyan are provided on both ends, red or blue which is short is selected as the third color. The third color depends on the intensity of components of the LEDs.

EMBODIMENT 19

Figure 22:
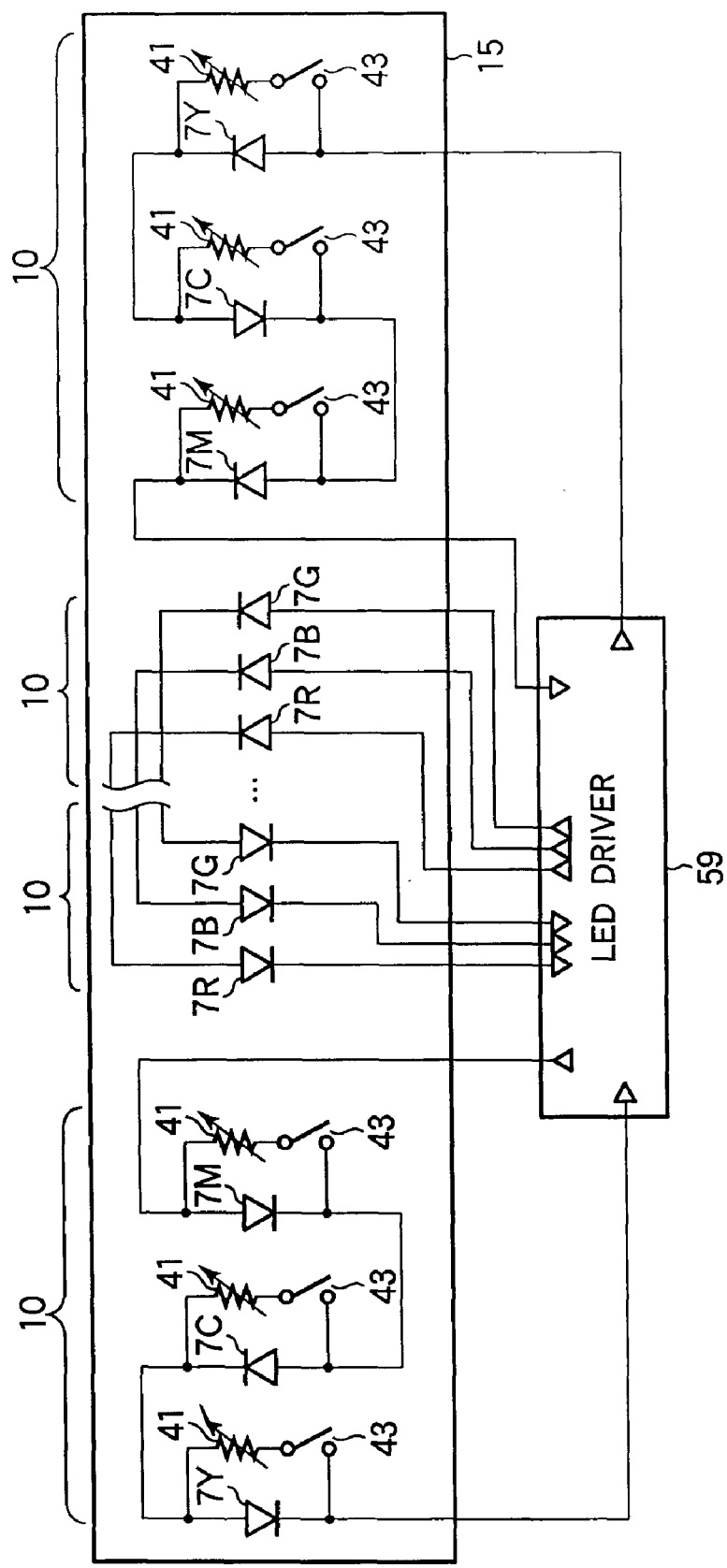
FIG. 22 shows a schematic configuration of an LED module according to Embodiment 19 in the mode for carrying out the invention.

FIG. 22 shows a schematic configuration of an LED module 15 according to Embodiment 19 in the present mode for carrying out the invention. The configuration shown in FIG. 22 is a modification of the configuration of Embodiment 17, and it is an example of a configuration in which a color irregularity correcting resistor 41 and a switch 43 are provided for each of the three LEDs 7Y, 7C, and 7M at ends of the LED module 15 on the side of the reflective surfaces 13L and 13R.

EMBODIMENT 20

Figure 23:
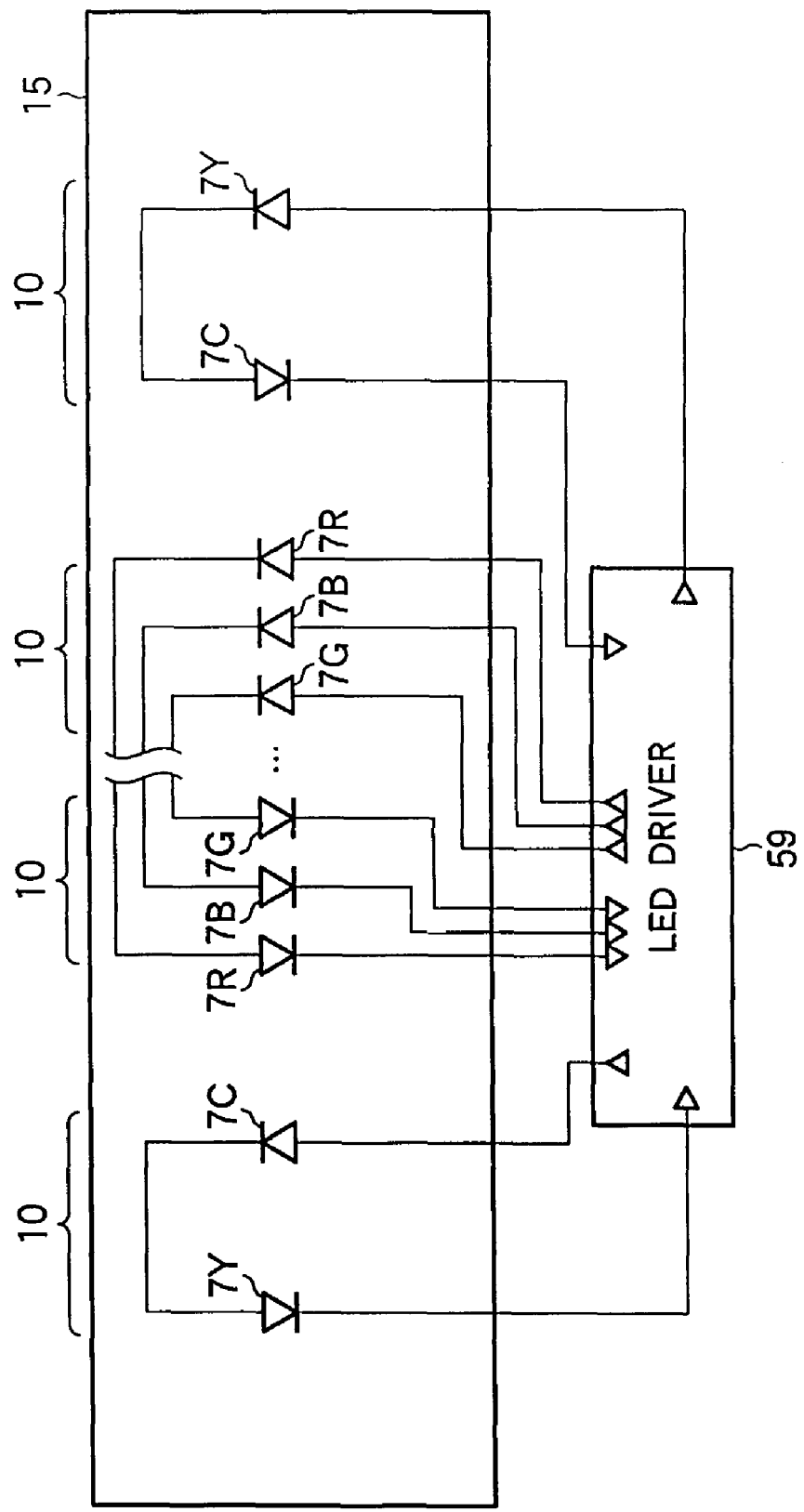
FIG. 23 shows a schematic configuration of an LED module according to Embodiment 20 in the mode for carrying out the invention.

FIG. 23 shows a schematic configuration of an LED module 15 according to Embodiment 20 in the present mode for carrying out the invention. A configuration is shown, in which LEDs 7 in two colors (a yellow LED 7Y and a cyan LED 7C in the figure) among yellow, cyan, and magenta are selected and controlled in the same way by the driver 59, and LEDs 7R, 7G, and 7B in the three primary colors are controlled color by color.

EMBODIMENT 21

Figure 24:
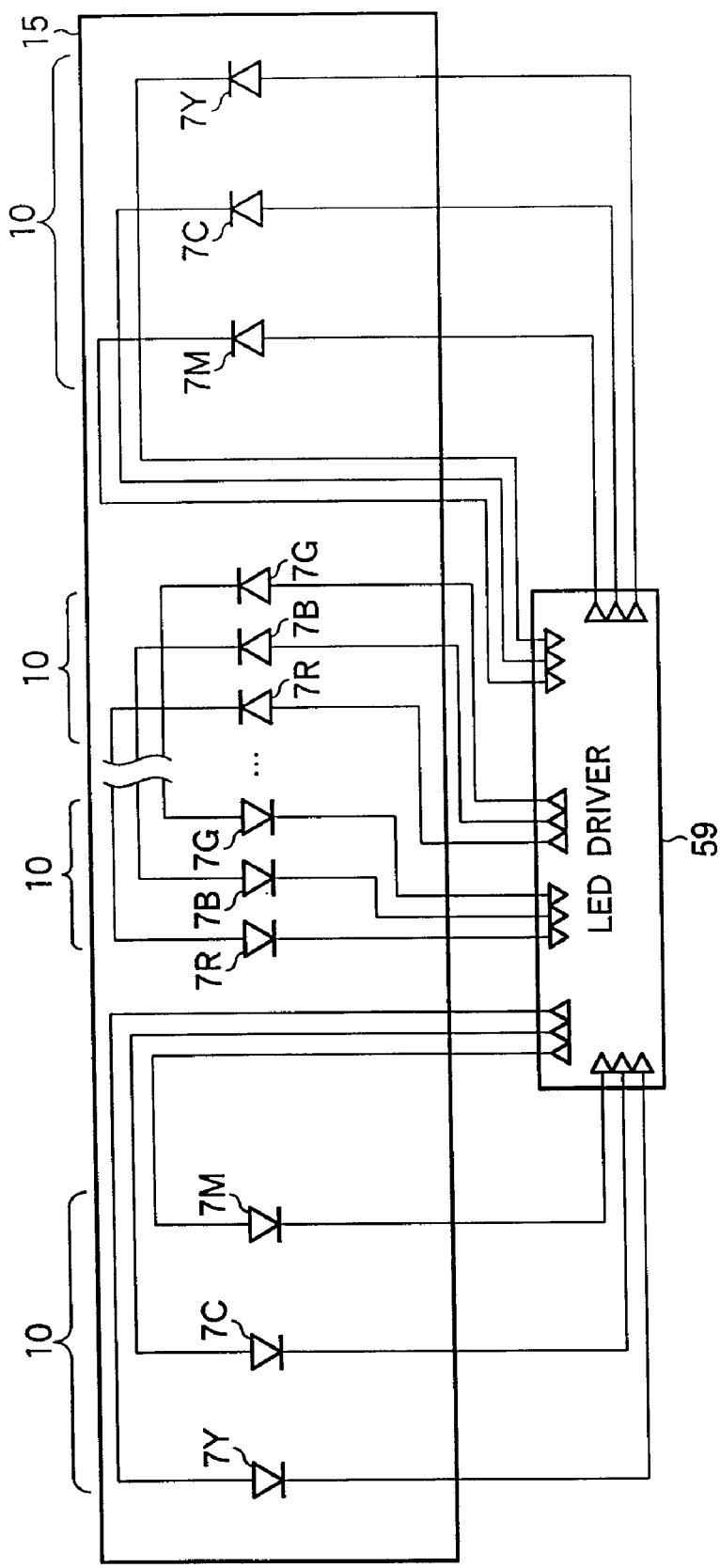
FIG. 24 shows a schematic configuration of an LED module according to Embodiment 21 in the mode for carrying out the invention.

FIG. 24 shows a schematic configuration of an LED module 15 according to Embodiment 21 in the present mode for carrying out the invention. It is a configuration similar to the LED configuration of Embodiment 17 shown in FIG. 20 except that the LEDs 7Y, 7C, and 7M in three colors, i.e., yellow, cyan, and magenta are separately controlled by respective currents from the LED driver 59 to correct luminance and chromaticity.

EMBODIMENT 22

Figure 25:
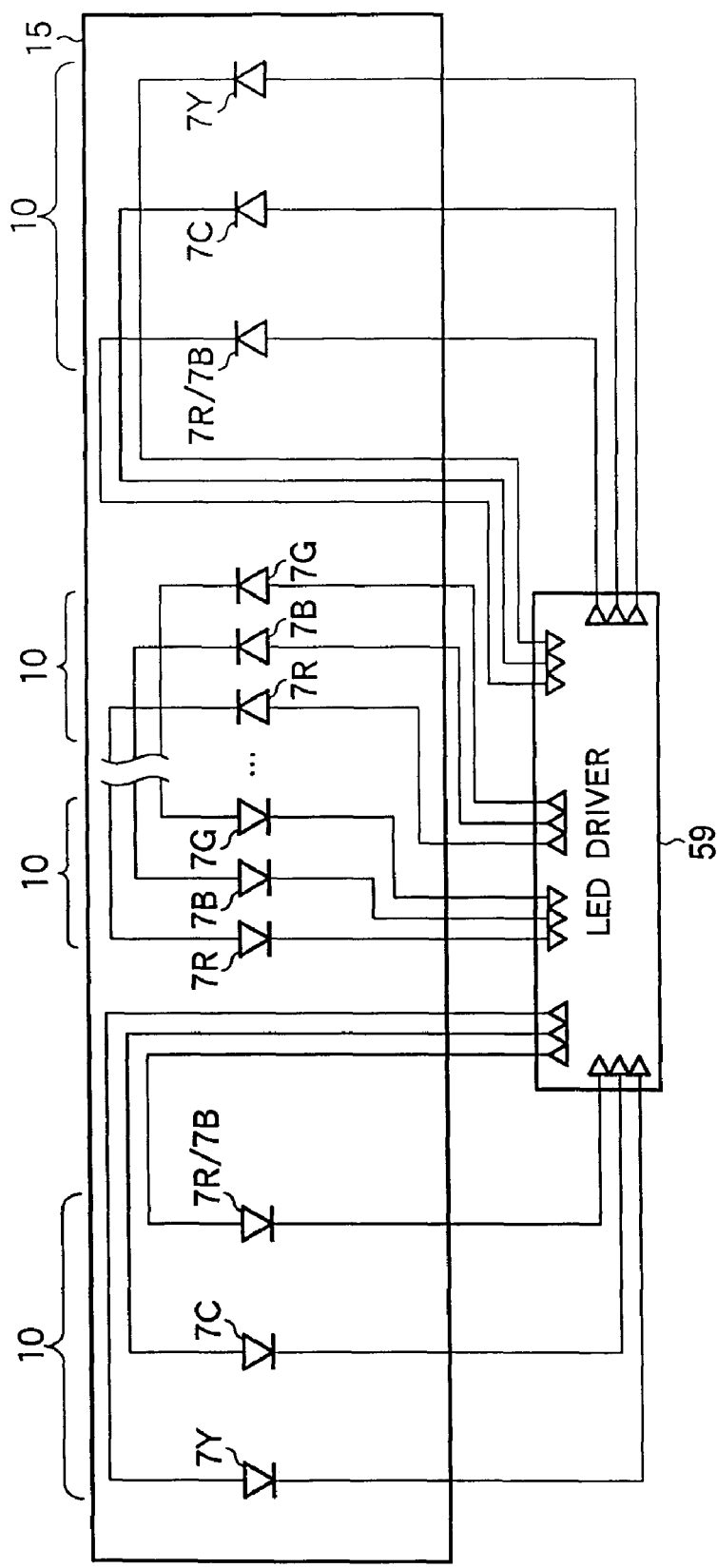
FIG. 25 shows a schematic configuration of an LED module according to Embodiment 22 in the mode for carrying out the invention.

FIG. 25 shows a schematic configuration of an LED module 15 according to Embodiment 22 in the present mode for carrying out the invention. It is a configuration similar to the LED configuration of Embodiment 18 shown in FIG. 21 except that the yellow LEDs 7Y, the cyan LEDs 7C, and the red LEDs 7R or blue LEDs 7B are separately controlled by respective currents from the LED driver 59 to correct luminance and chromaticity.

EMBODIMENT 23

Figures 26A, 26B:
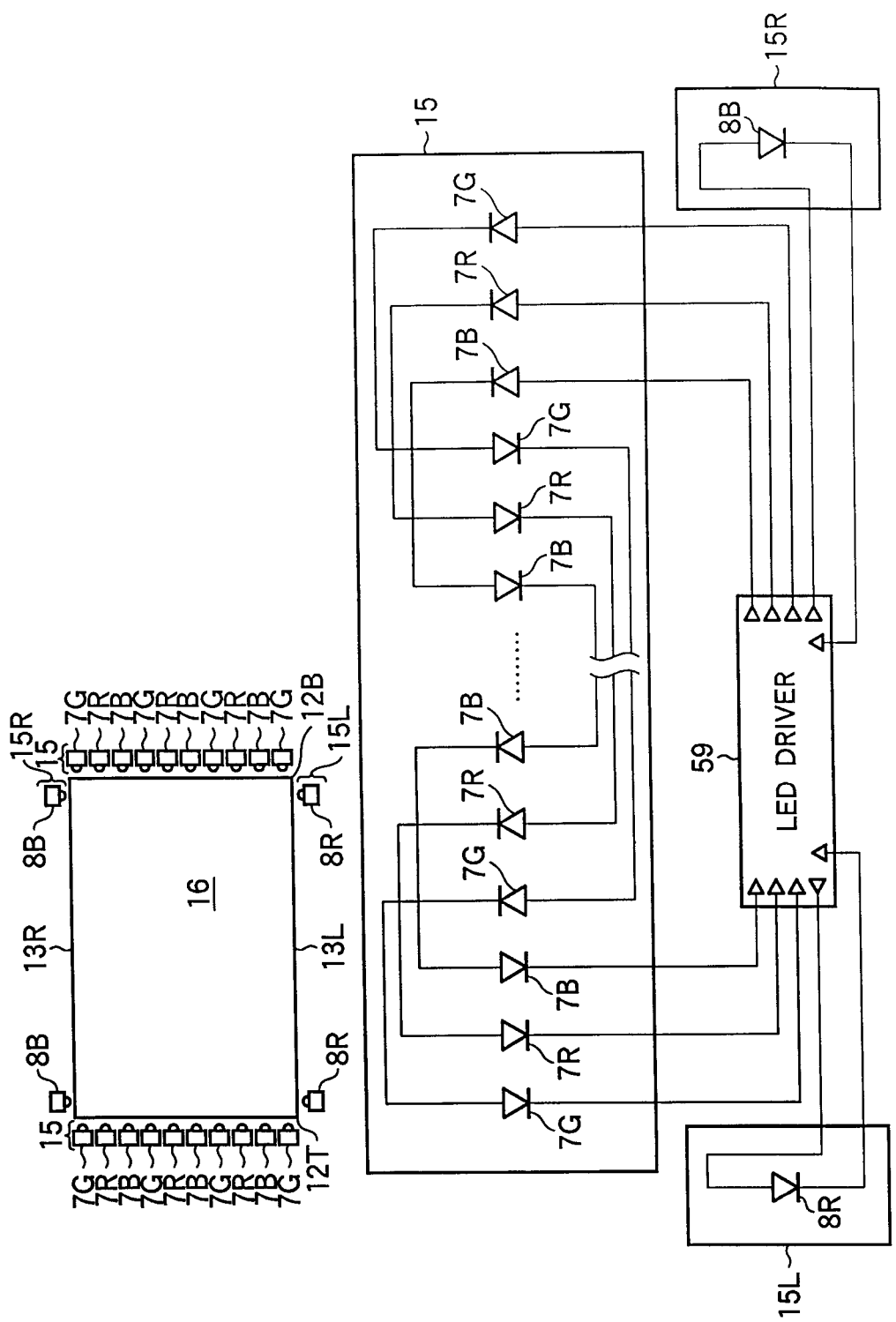
FIGS. 26A and 26B shows a schematic configuration of an LED module according to Embodiment 23 in the mode for carrying out the invention.

FIGS. 26A and 26B show schematic configurations of an LED module 15 according to Embodiment 23 in the present mode for carrying out the invention. FIG. 26A shows a positional relationship between a light exit surface 16 of a light guide 11 of a backlight unit and an LED module 15 according to the present embodiment, the relationship being shown in a view taken in a direction normal to the light exit surface 16. In FIG. 26A, two opposite side surfaces along shorter sides of the light exit surface 16 which is rectangular constitute light entrance surfaces 12T and 12B, and two opposite surfaces along the longer sides constitute reflective surfaces 13R and 13L. FIG. 26B shows a schematic configuration of LED modules 15, 15R, and 15L according to the present embodiment. LEDs 8 of the LED modules 15R and 15L are separately driven by the LED driver 59.

A plurality of LEDs 7 are provided side by side along the light entrance surfaces 12T and 12B of the light guide 11 from the neighborhoods of top ends of the light entrance surfaces 12, the LEDs 7 being G (green) emission LEDs 7G, R (red) emission LEDs 7R, and B (blue) emission LEDs 7B which are provided in series in the order listed at substantially equal intervals.

On the other hand, a plurality of LEDs 7 are provided side by side along the light entrance surfaces 12T and 12B of the light guide 11 from the neighborhoods of bottom ends of the light entrance surfaces 12, the LEDs 7 being G (green) emission LEDs 7G, B (blue) emission LEDs 7B and R (red) emission LEDs 7R which are provided in series in the order listed at substantially equal intervals.

An LED module 15R is provided on the reflective surface 13R, the LED module 15R including B (blue) emission LEDs 8B provided at either end of the reflective surface 13R. An LED module 15L is provided on the reflective surface 13L, the LED module 15L including R (red) emission LEDs 8R provided at either end of the reflective surface 13L. The LEDs 8R and LEDs 8B serve as color irregularity correcting LEDs provided at the four corners of the light exit surface 16.

As already described with reference to FIG. 3, there is a shortage of red due to a mirror effect of the reflective surface 13L at the lower two corners of the light exit surface 16 also in the configuration of the LED module 15 in FIG. 26A. There is a shortage of blue due to a mirror effect of the reflective surface 13R at the upper two corners of the light exit surface 16. Any irregularity in color can be corrected by providing LEDs in the scarce colors as color irregularity correcting resistors. While the embodiments up to Embodiment 22 are based on the idea of reducing the luminance of excessive components by reducing the currents passed through the LEDs associated therewith, Embodiment 23 is an idealistic correcting method in that it not only supplements a scarce color but also corrects light quantity ratios at the periphery of the surface.

EMBODIMENT 24

Figure 27:
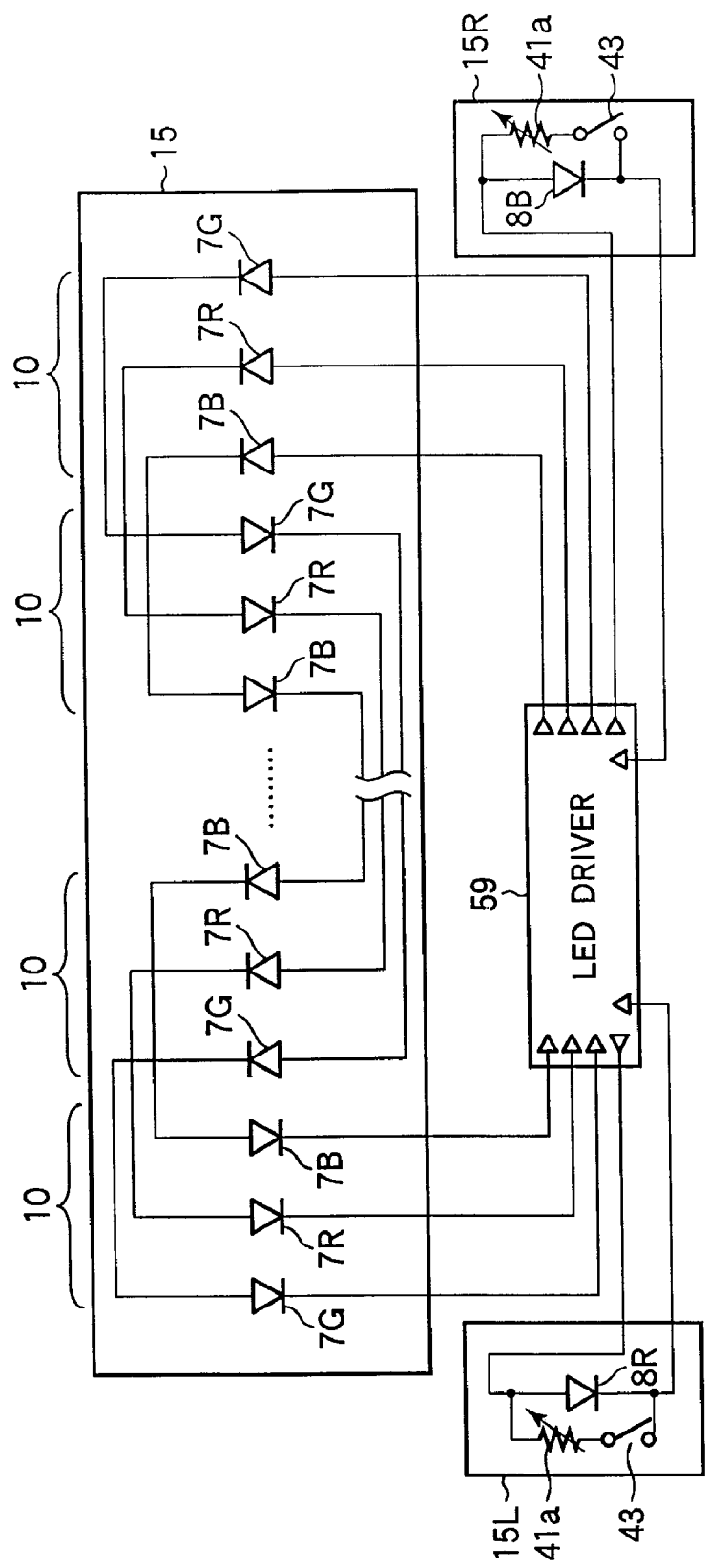
FIG. 27 shows a schematic configuration of an LED module according to Embodiment 24 in the mode for carrying out the invention.

FIG. 27 shows a schematic configuration of an LED module according to Embodiment 24 in the present mode for carrying out the invention. FIG. 27 shows a configuration in which a correcting resistor 41a is connected in parallel with each of the color irregularity correcting LEDs 8R and 8B of Embodiment 23 shown in FIG. 26.

EMBODIMENT 25

Figure 28:
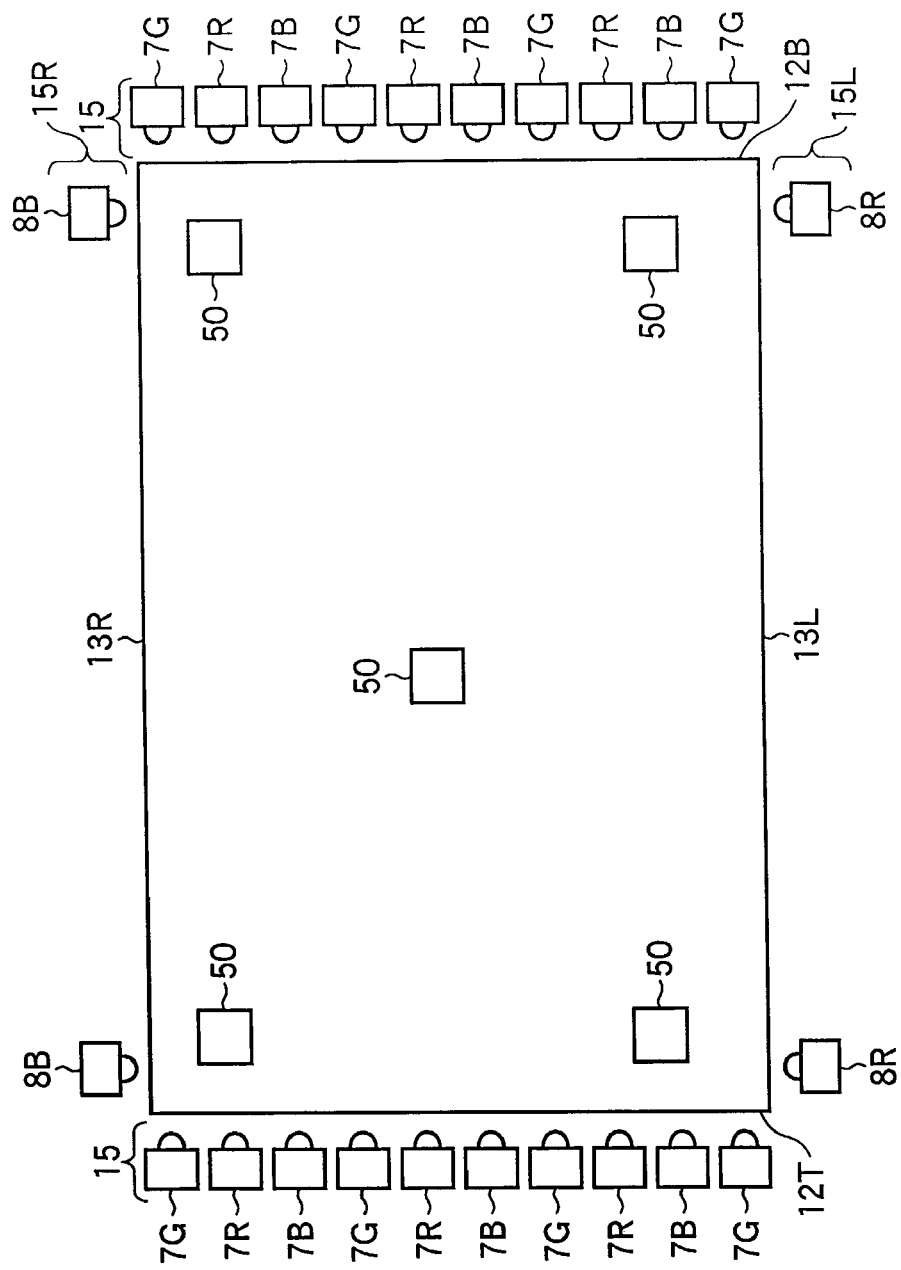
FIG. 28 shows a positional relationship between a light exit surface 16 of a light guide 11 of a backlight unit and an LED light module 15 according to Embodiment 25 in the mode for carrying out the invention, in a view taken in a direction normal to the light exit surface 16.

FIG. 28 shows a positional relationship between a light exit surface 16 of a light guide 11 of a backlight unit according to Embodiment 25, the positional relationship being shown in a view taken in a direction normal to the light exit surface 16. The configuration shown in FIG. 28 represents a method in which control according to Embodiments 23 and 24 is performed using a microcomputer (not shown) by providing a color sensor 50 at each of the four corners of the light exit surface 16 in addition to the configuration shown in FIG. 26A. The color sensors 50 are provided on the back side of the light exit surface 16 (the back side of the light guide) in locations at the four corners thereof where color irregularities can occur. Information on the luminance and chromaticity in such locations is transmitted to the microcomputer, and current values or electronic resistances are controlled to correct the chromaticity and luminance to preset targets. Priority is given to the correction of chromaticity. Alternatively, the target chromaticity and luminance may be determined with reference to the output of a color sensor provided in the middle of the surface.

EMBODIMENT 26

Figure 29:
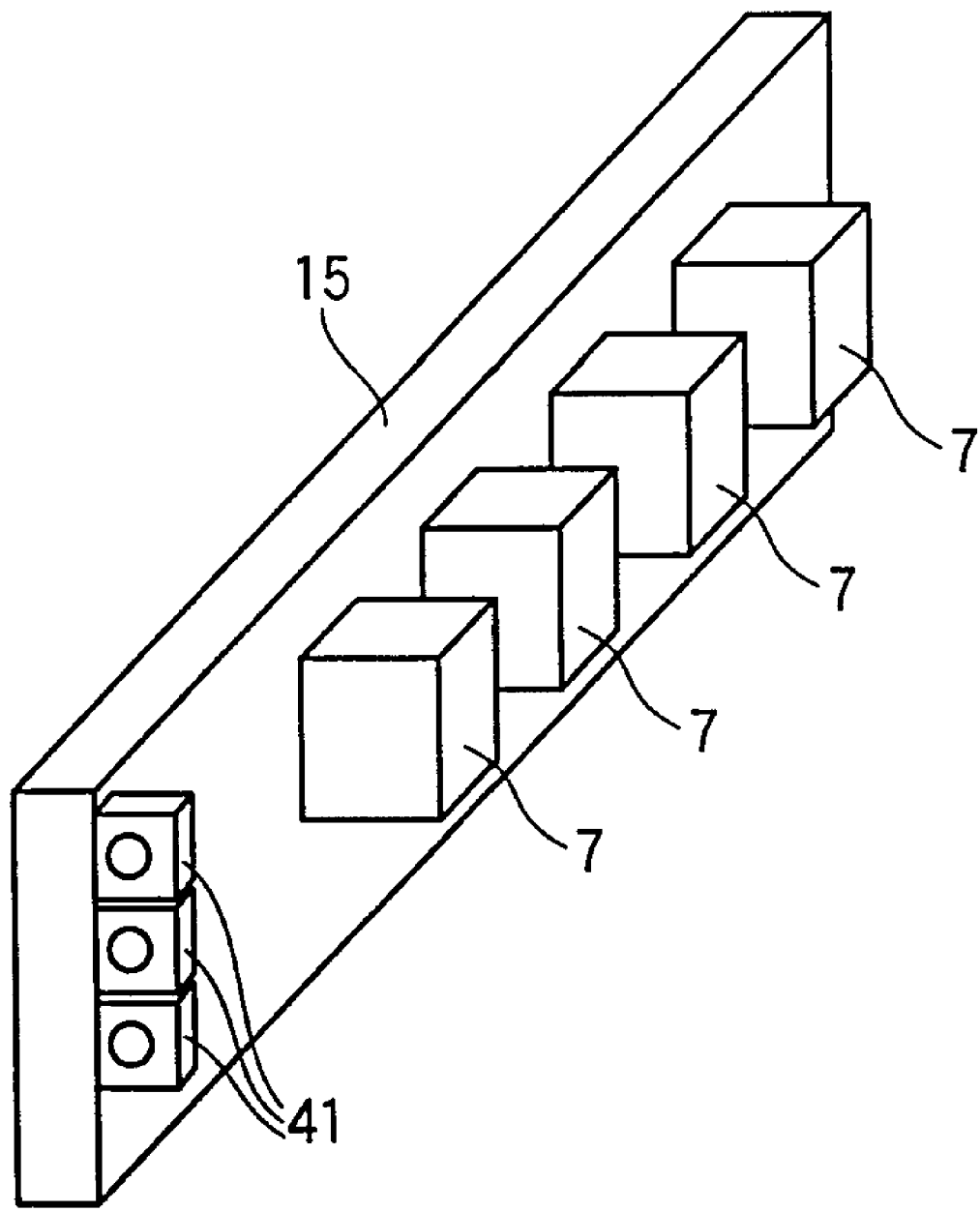
FIG. 29 shows a schematic configuration of an LED module 15 according to Embodiment 26 in the mode for carrying out the invention.

FIG. 29 is a perspective view showing a schematic configuration of an LED module 15 according to Embodiment 26 in the present mode for carrying out the invention. When a mechanical type is chosen as the color irregularity (luminance irregularity) correcting resistors 41 which are variable resistors, the color irregularity (luminance irregularity) correcting resistors 41 are provided at the ends of the LED module 15, and adjusting holes are provided in the housing which is a mold or sheet metal. At the time of manufacture, the values of the resistors are increased or decreased, and currents passed through LEDs 7 on both ends of the LED module 15 are thereby adjusted to correct chromaticity.

As described above, in the present mode for carrying out the invention, the light output of LEDs which can cause an irregularity in color or luminance is controlled, or supplementary LEDs are added for such LEDs. It is therefore possible to reduce color irregularities at four corners of a display area which occur in a low-cost edge type LED backlight system having a small number of LEDs.

The invention is not limited to the above-described mode for carrying out the same and may be modified in various ways.

Although LED modules 15 are provided on both sides of a light guide 11 in the above-described mode for carrying out the invention, the invention is not limited to such a configuration, and an LED module 15 may be provided only on one side. In the case of a light guide having a wedge-shaped section, an LED module 15 may obviously be provided only on one side of the same.

Although the invention is applied to a single light guide in the form of a plane parallel plate in the above-described mode for carrying out the invention, the invention is not limited to the same and may be applied to all backlight units having other structures including a double guide surface type which is a structure in which two light guides are stacked one over another. Furthermore, the invention is not limited to a backlight unit, it can be applied to a frontlight unit as well.

Although a light guide 11 constituted by a transparent member is used as a light guide region in the above-described mode for carrying out the invention, the invention is not limited to the same. For example, a light guide region may obviously be an air layer that is a vacant region as long as a reflective member is mounted on a side of the light guide region.

Although LEDs are used as light sources in the above-described mode for carrying out the invention, the invention is not limited to them, and any type of light-emitting bodies may be used as long as an array of discrete light sources can be formed using them. The surface illuminators in the above-described embodiments may be mirror-symmetric in that LEDs are arranged in the same order of colors from both ends thereof.

What is claimed is:

1. A surface illuminator comprising:
    a light exit region which spreads in the form of a plane and from which light exits;
    a light guide region arranged to guide light to the light exit region;
    a light entrance surface through which light enters the light guide region;
    a reflective surface extending from an end of the light entrance surface and reflecting light in the light guide region; and
    an LED module including a white LED set provided at only one end of the LED module and an LED set arranged next to the white LED set;
    wherein
    the white LED set includes only one or more white LEDs;
    the LED set includes a plurality of LEDs that emit only light having a color that is not white; and
    the one or more white LEDs and the plurality of LEDs are discretely provided along the light entrance surface.

2. A surface illuminator according to claim 1, further comprising:
    a luminance irregularity correcting resistor connected in parallel with each of the one or more white LEDs; and
    a switch arranged to switch the luminance irregularity correcting resistor.

3. A surface illuminator according to claim 1, wherein the one or more white LEDs are separately driven.

4. A surface illuminator according to claim 1, wherein the LEDs are arranged in the same order of colors from both ends of the reflective surface.

5. A surface illuminator according to claim 1, wherein optical sensors arranged to control luminance and chromaticity are provided at four corners and the center of a back side or front side of the light exit region.

6. A surface illuminator according to claim 1, wherein the LED module is provided on one side of the light entrance surface.

7. A surface illuminator according to claim 2, further comprising a housing defined by a sheet metal or mold including an adjusting hole arranged to allow the luminance irregularity correcting resistor to be adjusted from outside.

8. A liquid crystal display having a liquid crystal sealed between a pair of substrates provided opposite to each other, the display comprising a surface illuminator according to claim 1.

9. A surface illuminator according to claim 1, wherein the LED module includes another white LED set provided at another end of the LED module;
    the another white LED set includes only one or more white LEDs; and
    only the LED set is provided between the white LED set and the another white LED set.

* * * * *